US010640108B2

(12) United States Patent
Katou et al.

(10) Patent No.: US 10,640,108 B2
(45) Date of Patent: May 5, 2020

(54) ON-BOARD TERMINAL DEVICE AND VEHICLE COLLISION PREVENTION METHOD

(71) Applicant: HITACHI CONSTRUCTION MACHINERY CO., LTD., Tokyo (JP)

(72) Inventors: Seiya Katou, Tokyo (JP); Akiyoshi Kirimura, Tsuchiura (JP); Takeshi Ito, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 219 days.

(21) Appl. No.: 15/579,622

(22) PCT Filed: May 17, 2016

(86) PCT No.: PCT/JP2016/064574
§ 371 (c)(1),
(2) Date: Dec. 5, 2017

(87) PCT Pub. No.: WO2016/199547
PCT Pub. Date: Dec. 15, 2016

(65) Prior Publication Data
US 2018/0148050 A1    May 31, 2018

(30) Foreign Application Priority Data

Jun. 12, 2015  (JP) .................. 2015-119093

(51) Int. Cl.
*B60W 30/09*    (2012.01)
*H04W 4/46*    (2018.01)
(Continued)

(52) U.S. Cl.
CPC ............. *B60W 30/09* (2013.01); *B60R 21/00* (2013.01); *G08G 1/09* (2013.01); *G08G 1/16* (2013.01);
(Continued)

(58) Field of Classification Search
None
See application file for complete search history.

(56) References Cited

U.S. PATENT DOCUMENTS 6,321,147 B1 *  11/2001  Takeda ................. G05D 1/0038
                                            180/167
6,480,102 B1 *  11/2002  Miller ................. B60W 40/064
                                            340/436
(Continued)

FOREIGN PATENT DOCUMENTS

JP        05-127747 A      5/1993
JP    2009-290688 A      12/2009
(Continued)

OTHER PUBLICATIONS

JP 2015007818—Machine Translation (Year: 2015).*
International Search Report of PCT/JP2016/064574 dated Aug. 16, 2016.

*Primary Examiner* — Kevin T Bates
*Assistant Examiner* — Ronak Patel
(74) *Attorney, Agent, or Firm* — Mattingly & Malur, P.C.

(57) ABSTRACT

An on-board terminal device includes a location measuring section that measures a location of an own vehicle, a wireless communication section that transmits own vehicle information including location information of the own vehicle to other vehicles and receives other vehicle information including location information of the other vehicles from the other vehicles by execution of wireless communication with the other vehicles, and a monitoring section that estimates the location of the other vehicles and calculates a relative distance between the own vehicle and the other vehicles when the wireless communication has been interrupted, and executes an alarm process for preventing colli- (Continued)

sion of the own vehicle and the other vehicles when the relative distance is less than a predetermined threshold.

9 Claims, 12 Drawing Sheets

(51) Int. Cl.
*G08G 1/09* (2006.01)
*G08G 1/16* (2006.01)
*B60R 21/00* (2006.01)
*H04L 29/14* (2006.01)
*H04W 4/02* (2018.01)
*H04W 4/029* (2018.01)
*H04W 4/20* (2018.01)
*H04L 29/08* (2006.01)

(52) U.S. Cl.
CPC ............ *G08G 1/163* (2013.01); *G08G 1/166* (2013.01); *H04L 69/40* (2013.01); *H04W 4/023* (2013.01); *H04W 4/46* (2018.02); *B60W 2554/801* (2020.02); *B60W 2556/65* (2020.02); *H04L 67/12* (2013.01); *H04W 4/029* (2018.02); *H04W 4/20* (2013.01)

(56) References Cited

U.S. PATENT DOCUMENTS

| | | | | |
|---|---|---|---|---|
| 6,624,782 B2 * | 9/2003 | Jocoy | ................... | G01S 13/931 342/195 |
| 6,662,108 B2 * | 12/2003 | Miller | ................... | G08G 1/164 340/435 |
| 6,721,572 B1 * | 4/2004 | Smith | ................... | H04W 4/029 455/456.1 |
| 6,882,923 B2 * | 4/2005 | Miller | ................ | B60K 31/0008 701/96 |
| 8,063,793 B2 * | 11/2011 | Shrum, Jr. | ............. | G08G 1/127 340/501 |
| 8,170,787 B2 * | 5/2012 | Coats | ...................... | G01S 7/412 340/435 |
| 8,924,139 B2 * | 12/2014 | Louis | ................... | G08G 5/0021 701/301 |
| 8,935,086 B2 * | 1/2015 | Sadekar | ........... | G08G 1/096716 701/301 |
| 9,047,773 B2 * | 6/2015 | Chen | ................ | G08G 1/096741 |
| 9,536,156 B2 * | 1/2017 | Wey | .................. | G08G 1/09623 |
| 10,139,829 B1 * | 11/2018 | Mariet | ...................... | B60T 7/22 |
| 10,249,105 B2 * | 4/2019 | Palmer | ................... | G07C 5/008 |
| 10,497,187 B2 * | 12/2019 | Palmer | ................ | G07C 5/0866 |
| 2003/0139881 A1 * | 7/2003 | Miller | ................... | B60R 21/013 701/301 |
| 2005/0190952 A1 * | 9/2005 | Nagasawa | ................. | B60R 1/00 382/103 |
| 2008/0015772 A1 * | 1/2008 | Sanma | ................... | B60K 35/00 701/408 |
| 2009/0096597 A1 * | 4/2009 | Avery, Jr. | ............. | G08G 1/0962 340/435 |
| 2009/0243880 A1 * | 10/2009 | Kiuchi | .................. | G01B 11/26 340/903 |
| 2009/0259400 A1 * | 10/2009 | Coats | ...................... | G01S 17/86 701/301 |
| 2009/0295676 A1 * | 12/2009 | Yamazaki | ........... | H01Q 1/3233 343/876 |
| 2009/0326819 A1 * | 12/2009 | Taguchi | ................ | B60W 40/04 701/301 |
| 2011/0040481 A1 * | 2/2011 | Trombley | .............. | G08G 1/163 701/301 |
| 2012/0286974 A1 * | 11/2012 | Claussen | ................ | G08G 1/162 340/935 |
| 2014/0240114 A1 * | 8/2014 | Waeller | .................. | B60Q 9/008 340/435 |
| 2014/0309864 A1 * | 10/2014 | Ricci | ....................... | H04W 4/21 701/36 |
| 2014/0358413 A1 * | 12/2014 | Trombley | ................ | G06G 1/00 701/118 |
| 2015/0235557 A1 * | 8/2015 | Engelman | ............ | G08G 1/091 701/24 |
| 2017/0178512 A1 * | 6/2017 | Kannon | ................... | B60R 1/00 |
| 2017/0236420 A1 * | 8/2017 | Varoglu | .................. | G08G 1/163 701/70 |

FOREIGN PATENT DOCUMENTS

| | | |
|---|---|---|
| JP | 2013-125345 A | 6/2013 |
| JP | 2015-007818 A | 1/2015 |

* cited by examiner

FIG. 2
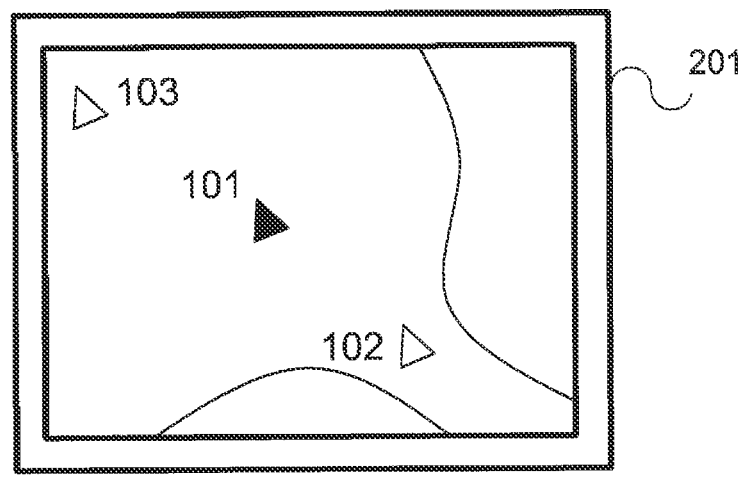
(a)
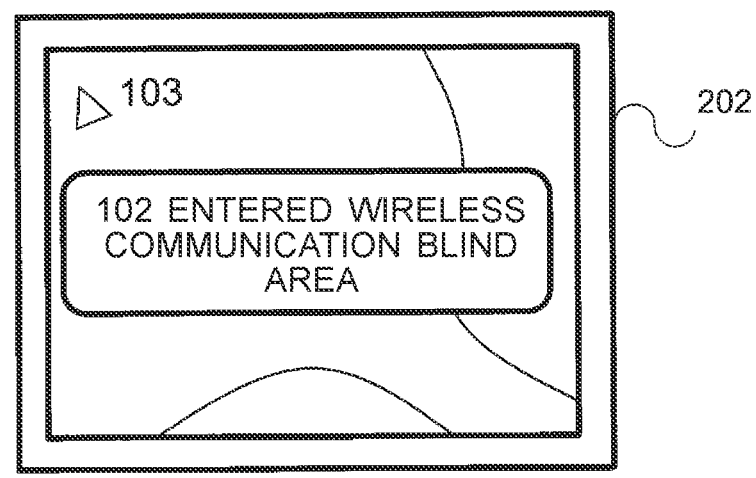
(b)
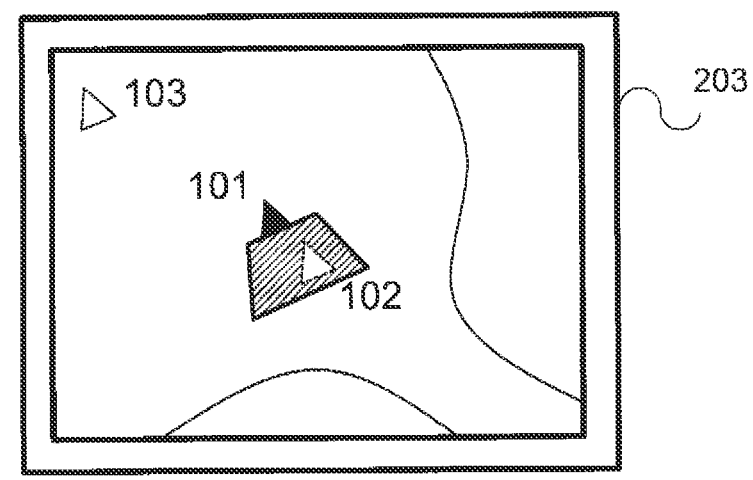
(c)

FIG. 3

| 311 | 312 | 313 | 314 | 315 | 316 | 317 | 318 | 319 |
|---|---|---|---|---|---|---|---|---|
| VEHICLE IDENTIFIER | VEHICLE TYPE | DEGREE OF LATITUDE | DEGREE OF LONGITUDE | VEHICLE SPEED | TRAVELING DIRECTION | VEHICLE DIRECTION | VEHICLE HEIGHT | VEHICLE STATUS |

| 132 VEHICLE IDENTIFIER | 133 VEHICLE TYPE | 134 VEHICLE HEIGHT | 135 DEGREE OF LATITUDE | 136 DEGREE OF LONGITUDE | 137 VEHICLE SPEED | 138 TRAVELING DIRECTION | 139 VEHICLE DIRECTION | 142 VEHICLE STATUS | 140 RECEPTION TIME | 141 MANAGING STATUS |
|---|---|---|---|---|---|---|---|---|---|---|
| 101 (OWN VEHICLE) | DUMP TRUCK | 8 | 45.001 | 135.001 | 20 | 0 | 0 | 1 | 2015/01/01 11:22:32.0 | 1 |
| 102 | LIGHT VEHICLE | 3 | 45.000 | 135.002 | 25 | 315 | 315 | 0 | 2015/01/01 11:22:33.3 | 1 |
| 103 | EXCAVATOR | 5 | 45.002 | 135.000 | 0.0 | 315 | 315 | 0 | 2015/01/01 11:22:33.2 | 1 |
| ⋮ | ⋮ | 0 | 0 | 0 | 0 | 0 | 0 | ⋮ | ⋮ | 0 |
| ⋮ | ⋮ | 0 | 0 | 0 | 0 | 0 | 0 | ⋮ | ⋮ | 0 |
| ⋮ | ⋮ | 0 | 0 | 0 | 0 | 0 | 0 | ⋮ | ⋮ | 0 |

| 151 | 152 | 153 | 154 | 155 | 159 | 156 | 157 | 158 |
|---|---|---|---|---|---|---|---|---|
| VEHICLE HEIGHT | VEHICLE TYPE | RELATIVE DISTANCE | ANGLE | RELATIVE DIRECTION | RELATIVE VEHICLE STATUS | NUMBER OF TIMES | NUMBER OF SUCCESSFUL RECEPTION | RECEPTION RATE |
| 0-3 | LIGHT VEHICLE | 0-5 | 0-22.5 | 0-360 | 0 | 100 | 100 | 1.0 |
| 0-3 | LIGHT VEHICLE | 0-5 | 22.5-45 | 0-360 | 0 | 80 | 80 | 1.0 |
| ⋮ | | | | | | | | |
| 0-3 | LIGHT VEHICLE | 0-5 | 125-147.5 | 0-360 | 0 | 30 | 0 | 0.0 |
| 0-3 | LIGHT VEHICLE | 5-10 | 125-147.5 | 0-360 | 0 | 30 | 3 | 0.1 |
| ⋮ | | | | | | | | |
| 5-7 | DUMP TRUCK | 0-5 | 0-22.5 | 0-90, 270-360 | 1 | 100 | 100 | 1.0 |
| 5-7 | DUMP TRUCK | 0-5 | 0-22.5 | 90-270 | 1 | 10 | 7 | 0.7 |
| 5-7 | DUMP TRUCK | 0-5 | 22.5-45 | 0-90, 270-360 | 1 | 90 | 90 | 1.0 |
| ⋮ | | | | | | | | |

150

FIG. 6
(a)
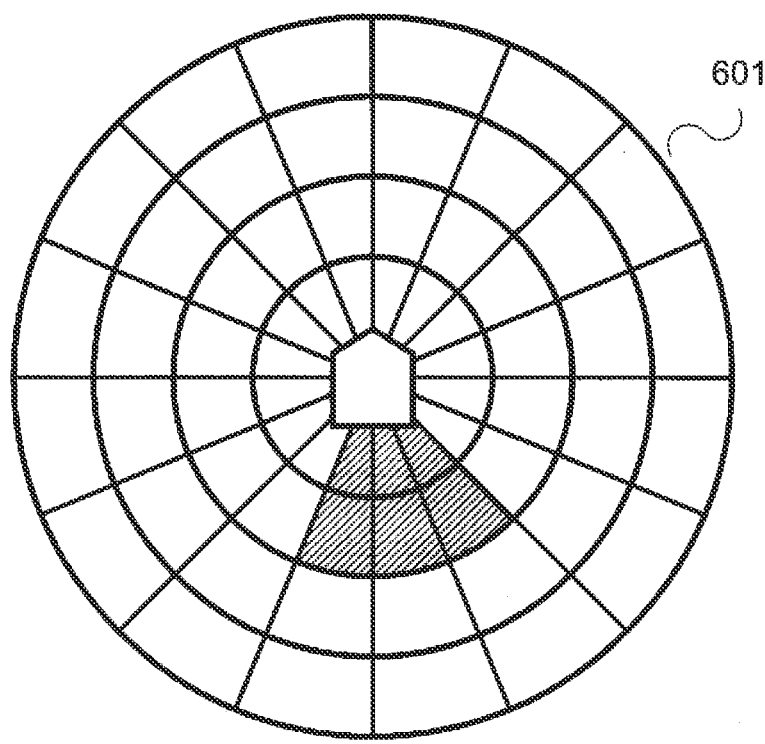
(b)
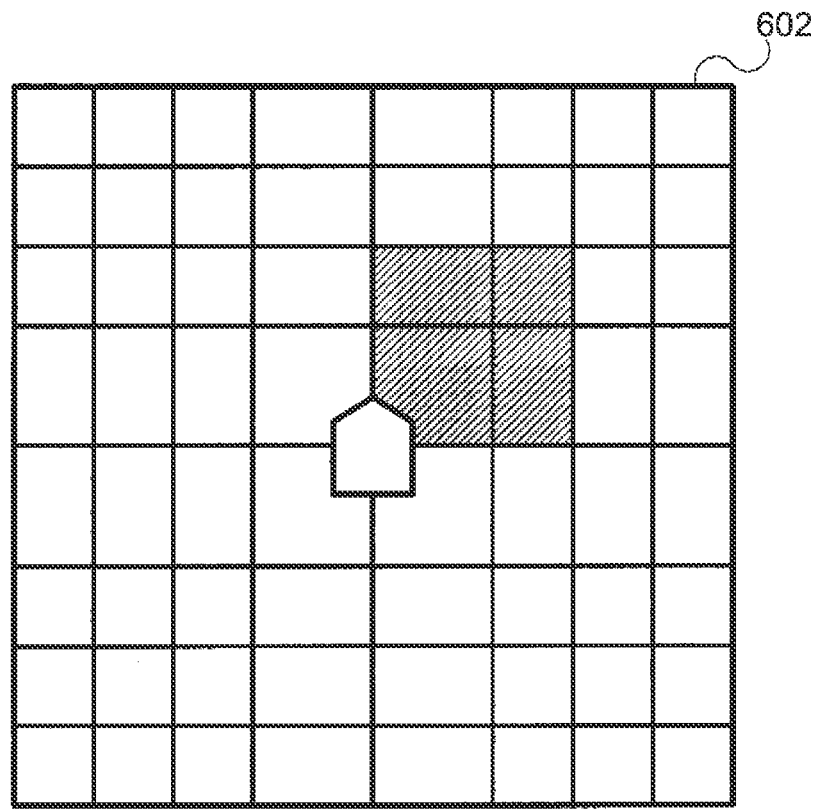

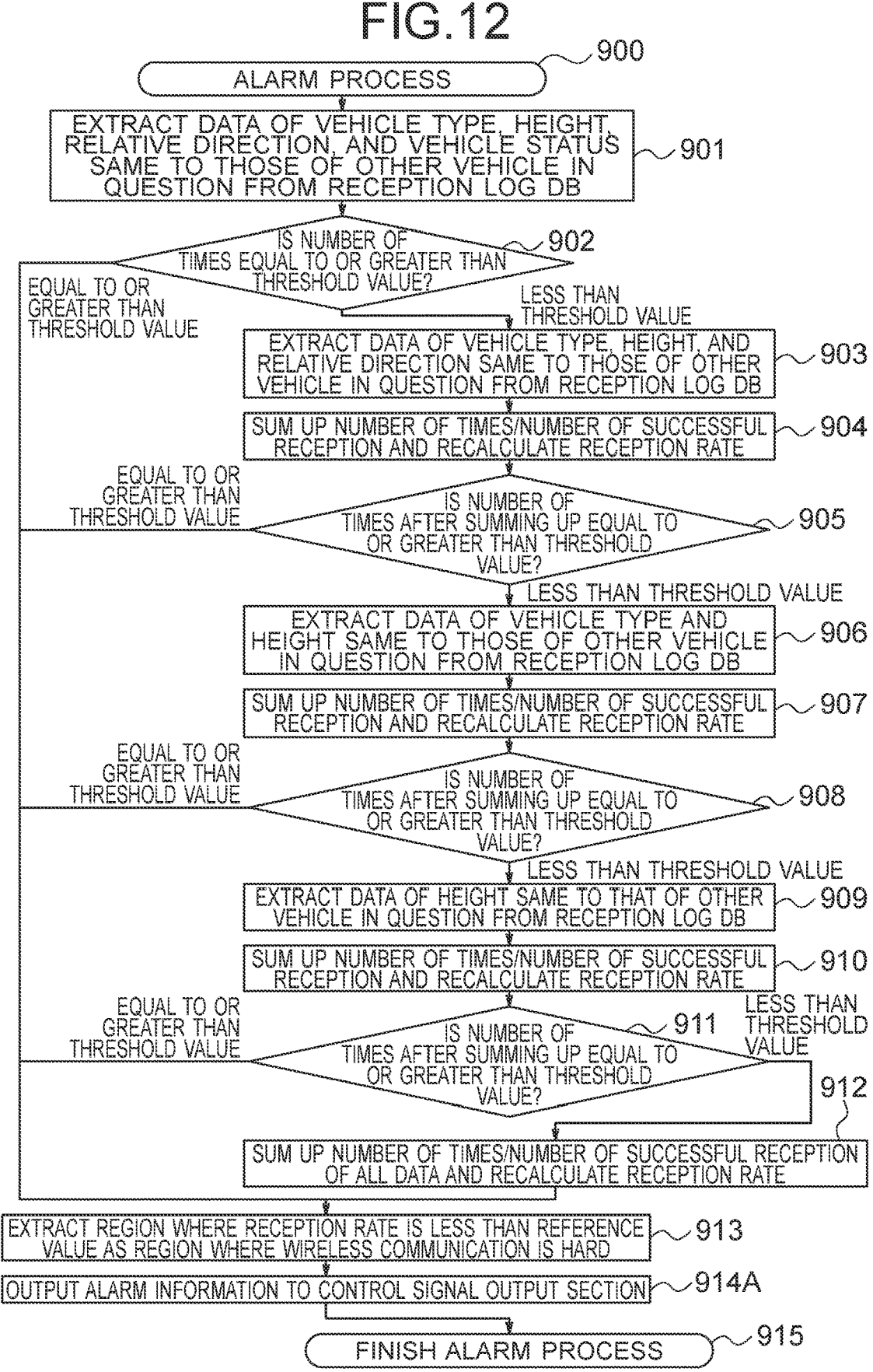

ON-BOARD TERMINAL DEVICE AND VEHICLE COLLISION PREVENTION METHOD

TECHNICAL FIELD

The present invention relates to an on-board terminal device and a vehicle collision prevention method.

BACKGROUND ART

Generally, in mines, construction sites and the like, haulage vehicles such as a dump truck are used. With respect to these haulage vehicles, when a traffic collision occurs between vehicles, in addition to the direct damage by the accident, a severe interference occurs in execution of the operation also because the mining operation in the mine and the construction work in the construction site are interrupted. Therefore, it becomes important to surely prevent the traffic collision.

However, in these haulage vehicles, the blind spot for an operator operating the vehicle is wider compared with ordinary automobiles. Therefore, there is a problem that, even in a case where there exists another vehicle which may collide with the own vehicle, the operator cannot recognize the other vehicle and the traffic collision is liable to occur.

With respect to the problem described above, a system has been proposed which supplements the field of view of the operator to prevent the traffic collision. For example, a system is known which prevents collision by detecting a forward obstacle using a sensor such as a laser radar and issues an alarm. Also, in Patent Literature 1, there is described a device which acquires location information of other vehicles by wireless communication, issues an alarm in detecting proximity to the own vehicle, and thereby prevents collision.

CITATION LIST

Patent Literature

Patent Literature 1: JP1993-127747A

SUMMARY OF INVENTION

Technical Problem

In the haulage vehicles used in mines, construction sites, and the like, a region of poor condition for wireless communication is possibly found in the periphery of the own vehicle because of the radio wave shielding effect of the own vehicle body. For example, when an antenna for wireless communication is installed at the front part of the vehicle body, the radio wave is shielded by the vehicle body in the short distance region in the rear, and there is a case where wireless communication with other vehicles existing in the region is impossible. However, according to the technology described in Patent Literature 1, existence of such region has not been considered. Therefore, when another vehicle enters this region, in spite that the other vehicle exists at a short distance from the own vehicle and there is a high risk of collision with the own vehicle, an alarm cannot be issued. Accordingly, sufficient collision prevention could not be achieved.

The present invention has been achieved in view of the problems in prior arts as described above. The object of the present invention is to surely prevent collision of the own vehicle and other vehicles even when a region where wireless communication is not available exists in the periphery of the own vehicle.

Solution to Problem

An on-board terminal device according to the present invention includes a GPS that measures a location of an own vehicle or a location measuring sensor that obtains the location of the own vehicle based on the result of measurement of the relative distance to a reference point arranged within a mine; a transmitter that transmits own vehicle information including location information of the own vehicle to other vehicles and a receiver that receives other vehicle information including location information of the other vehicles transmitted from the other vehicles by execution of wireless communication with the other vehicles; and a computer, wherein the computer is configured to estimate the location of the other vehicles, calculate relative distances between the own vehicle and the other vehicles when the wireless communication has been interrupted, execute an alarm process for preventing collision of the own vehicle and the other vehicles when the relative distance is less than a predetermined threshold, and notify an operator of the own vehicle with a notification about the other vehicle, or output a control signal for executing travel control of the own vehicle to the own vehicle, wherein when the computer outputs alarm information including information on a region where the wireless communication is not available in the periphery of the own vehicle in the alarm process, the computer notifies the operator of the own vehicle of the region where the wireless communication is not available based on the alarm information, or outputs the control signal of a case where the other vehicles exist in the region where the wireless communication is not available based on the alarm information, and wherein the computer calculates a reception rate of the wireless communication with respect to a plurality of divided regions set beforehand in the periphery of the own vehicle respectively based on a reception log of the other vehicle information of the past, and determines divided regions where the reception rate of the wireless communication is less than a predetermined reference value out of the plurality of divided regions to be a region where the wireless communication is not available.

According to the vehicle collision prevention method by the present invention, vehicle collision is prevented by measuring a location of an own vehicle; transmitting own vehicle information including location information of the own vehicle to other vehicles and receiving other vehicle information including location information of the other vehicles from the other vehicles by executing wireless communication with the other vehicles; estimating locations of the other vehicles and calculating a relative distance between the own vehicle and the other vehicles when the wireless communication has been interrupted; and executing an alarm process for preventing collision of the own vehicle and the other vehicles by a computer when the relative distance is less than a predetermined threshold to thereby prevent collision of the own vehicle and the other vehicles, wherein alarm information including information on a region where the wireless communication is not available in the periphery of the own vehicle is outputted from the computer in the alarm process, and an operator of the own vehicle is notified of the region where the wireless communication is not available or, when there exists the other vehicle in the region where the wireless communication is not available, a control signal for executing travel control of the own vehicle is outputted to the own vehicle based on the alarm information.

Advantageous Effects of Invention

According to the present invention, even when a region where wireless communication is not available exists in the periphery of the own vehicle, collision of own vehicle and other vehicles can be surely prevented.

BRIEF DESCRIPTION OF DRAWINGS

FIG. 2 is a drawing showing an example of the notification screen to an operator.

FIG. 3 is a drawing showing a data format example of wireless communication information.

FIG. 4 is a drawing showing a configuration example of vehicle information DB.

FIG. 5 is a drawing showing a configuration example of a reception log DB.

FIG. 6 is a drawing showing a distribution example of a region where wireless communication is not available.

FIG. 12 is a process flow diagram showing a flow of the alarm process in the second embodiment of the present invention.

DESCRIPTION OF EMBODIMENT

Figure 1:
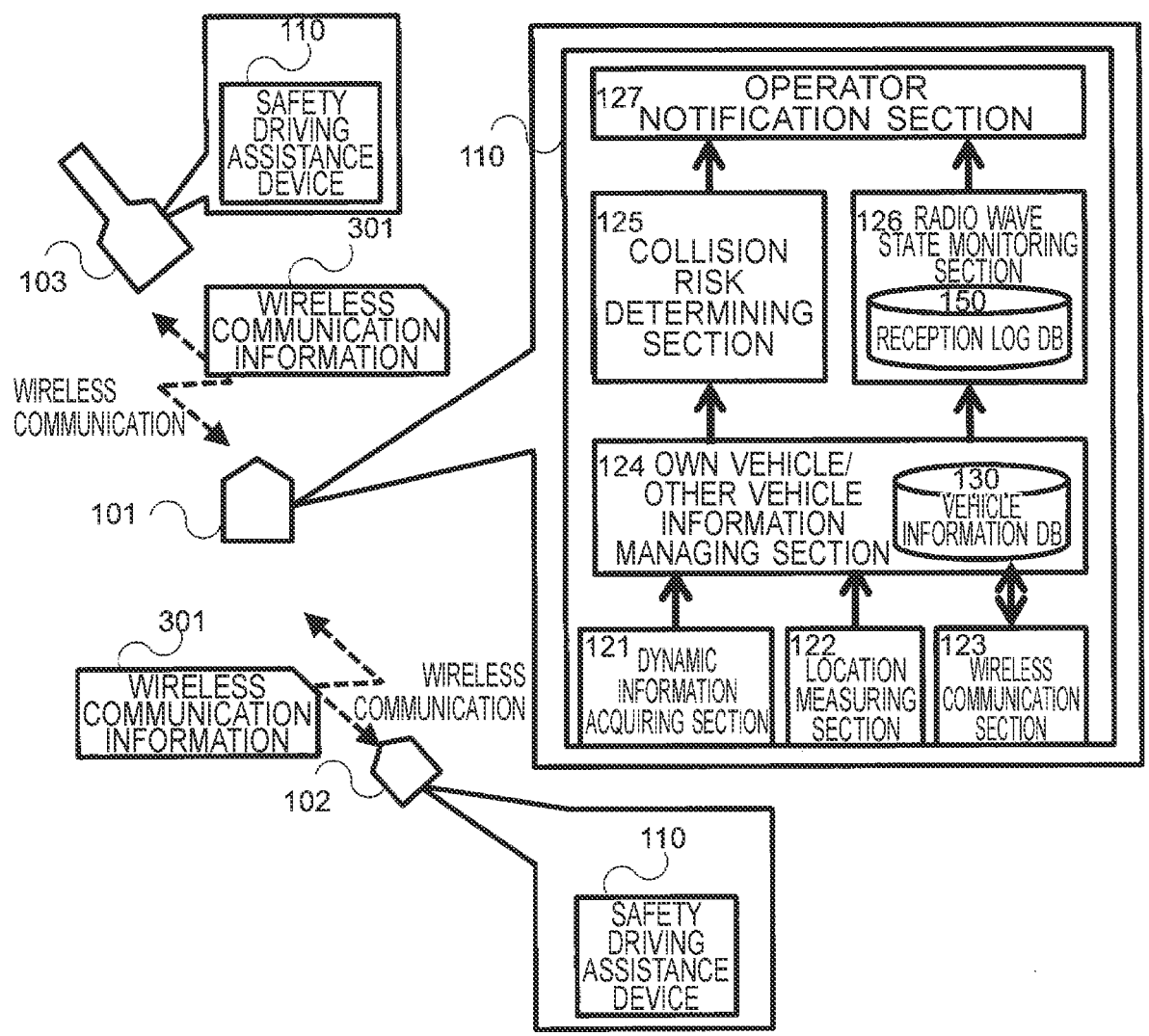
FIG. 1 is a drawing showing a configuration of a safety driving assistance system including a safety driving assistance device that is an application example of an on-board terminal device related to the first embodiment of the present invention.

Below, embodiments of the present invention will be explained in detail referring to the drawings.

First Embodiment

FIG. 1 is a drawing showing a configuration of a safety driving assistance system including a safety driving assistance device that is an application example of an on-board terminal device related to the first embodiment of the present invention. The safety driving assistance system shown in FIG. 1 is configured of vehicles 101, 102, 103 and safety driving assistance devices 110 mounted respectively on these vehicles.

The vehicles 101, 102, 103 are used in mine sites and the like. They include heavy work vehicle such as a dump truck, wheel loader, and a grader for example, and an excavator, a light vehicle and the like which do not fall under the category of the heavy work vehicle. Further, in FIG. 1, although there is shown an example of the safety driving assistance system where the safety driving assistance devices 110 are mounted respectively on three vehicles 101, 102, 103, the safety driving assistance system according to the present embodiment may be configured by mounting the safety driving assistance devices 110 respectively on vehicles fewer or greater in number than that mentioned above.

Each of the safety driving assistance devices 110 executes wireless communication with each other, and transmits and receives wireless communication information 301. By acquisition of the wireless communication information 301 from other safety driving assistance devices 110, each safety driving assistance device 110 acquires information of other vehicles, and prevents the risk of collision with other vehicles when there is such risk. Also, it is preferable that the wireless communication information 301 from each safety driving assistance device 110 is periodically transmitted to a range to which the radio wave can reach by broadcasting irrespective of existence of other vehicles in the periphery.

In FIG. 1, a configuration of the safety driving assistance device 110 boarded on the vehicle 101 is illustrated as a representative example. Below, the configuration of this safety driving assistance device 110 will be explained. Further, although the safety driving assistance devices 110 boarded on the vehicles 102, 103 also have similar configurations respectively, explanation thereof will be omitted. Also, in the explanation below, the vehicle 101 will be referred to as "own vehicle", and the vehicles 102, 103 will be referred to as "other vehicles".

The safety driving assistance device 110 includes a dynamic information acquiring section 121, a location measuring section 122, a wireless communication section 123, an own vehicle/other vehicle information managing section 124, a collision risk determining section 125, a radio wave state monitoring section 126, and an operator notification section 127.

The dynamic information acquiring section 121 acquires various information dynamically changing according to the state of the own vehicle as dynamic information on the own vehicle. This dynamic information includes operation information of the brake pedal, operation information of the steering, loading status information of the own vehicle, motion status information of the own vehicle, and so on for example. The dynamic information acquiring section 121 can acquire the dynamic information through an on-board network such as CAN (Controller Area Network) from an electronic control device (not illustrated) boarded on the own vehicle for example. Further, the dynamic information may be acquired by detecting the motion status of the own vehicle using a sensor such as an acceleration sensor and a yaw rate sensor. The dynamic information acquiring section 121 outputs the acquired dynamic information to the own vehicle/other vehicle information managing section 124.

The location measuring section 122 measures a location of the own vehicle, and outputs the location information showing the measurement result to the own vehicle/other vehicle information managing section 124. The location measuring section 122 can measure the absolute location of the own vehicle using GPS (Global Positioning System) for example. Also, the location measuring section 122 may obtain the location of the own vehicle based on the result of measurement of the relative distance to a reference point arranged within the mine by a sensor.

The wireless communication section 123 has a function of executing wireless communication with other vehicles. By this wireless communication, the wireless communication section 123 transmits the wireless communication information 301 on the own vehicle to the other vehicles, and receives the wireless communication information 301 on the other vehicles from the other vehicles.

The own vehicle/other vehicle information managing section 124 generates information on the state and location of the own vehicle (will be hereinafter referred to as "own vehicle information") based on the dynamic information from the dynamic information acquiring section 121 and the location information from the location measuring section 122. The own vehicle/other vehicle information managing section 124 has a vehicle information DB 130, stores the generated own vehicle information in this vehicle information DB 130, and manages the generated own vehicle information. The own vehicle information stored in the vehicle information DB 130 is outputted from the own vehicle/other vehicle information managing section 124 to the wireless communication section 123, and is transmitted from the wireless communication section 123 to the other vehicles as the wireless communication information 301 on the own vehicle. Meanwhile, information on the other vehicles (will be hereinafter referred to as "other vehicle information") received as the wireless communication information 301 by the wireless communication section 123 is outputted from the wireless communication section 123 to the own vehicle/other vehicle information managing section 124. The own vehicle/other vehicle information managing section 124 stores this other vehicle information in the vehicle information DB 130, and manages this other vehicle information. Also, the own vehicle information and the other vehicle information stored in the vehicle information DB 130 are outputted from the own vehicle/other vehicle information managing section 124 to the collision risk determining section 125 and radio wave state monitoring section 126 according to the necessity.

The collision risk determining section 125 determines the risk of collision of the own vehicle and other vehicles based on the own vehicle information and other vehicle information outputted from the own vehicle/other vehicle information managing section 124. For example, when the relative distance of the other vehicle with respect to the own vehicle becomes equal to or less than a constant distance, the collision risk determining section 125 determines that there is a collision risk. At this time, the determination method may be changed by the collision risk determining section 125 according to the combination of the vehicle type of the own vehicle and the other vehicle, and so on. As a result, when it is determined that there is a collision risk, the collision risk determining section 125 notifies the operator notification section 127 of the determination result.

The radio wave state monitoring section 126 monitors the radio wave state of wireless communication by the wireless communication section 123 in the periphery of the own vehicle based on the other vehicle information outputted from the own vehicle/other vehicle information managing section 124. The radio wave state monitoring section 126 has a reception log DB. 150, and monitors the radio wave state by storing a reception log of the other vehicle information in this reception log DB. 150 and managing the reception log of the other vehicle information. At this time, when such a state continues that the other vehicle information cannot be received from a certain other vehicle, the radio wave state monitoring section 126 determines that wireless communication has been interrupted between the other vehicle in question, and stores information showing the determination result in the reception log DB. 150. Also, the radio wave state monitoring section 126 estimates the relative location of the other vehicle in question with respect to the own vehicle based on the other vehicle information having been received from the other vehicle in question in the past, and alarm information on the other vehicle in question is outputted to the operator notification section 127 according to the necessity. This alarm information includes information showing that the other vehicle in question has entered the region where wireless communication is not available in the periphery of the own vehicle, information on the region, and so on. Also, concrete contents of the process executed by the radio wave state monitoring section 126 in monitoring the radio wave state will be explained below in detail.

Also, the region where wireless communication becomes hard in the periphery of the own vehicle changes according to the vehicle type, height, direction, traveling location in the mine and the like of the other vehicle. Therefore, it is preferable that the radio wave state monitoring section 126 manages such information in the reception log DB. 150, and identifies the region where wireless communication is not available using such information.

The operator notification section 127 executes notification on other vehicles having a risk of collision with the own vehicle to the operator of the own vehicle based on the determination result of the collision risk notified from the collision risk determining section 125 and the alarm information outputted from the radio wave state monitoring section 126. The operator notification section 127 can execute notification on the other vehicles by ringing a buzzer, lighting a lamp, and displaying an alarm screen for example.

Also, with respect to the safety driving assistance device 110, the dynamic information acquiring section 121, the own vehicle/other vehicle information managing section 124, the collision risk determining section 125, and the radio wave state monitoring section 126 described above can be achieved respectively using the process of computers configured of CPU (Central Processing Unit), RAM (Random Access Memory), ROM (Read Only Memory), and the like. Also, the vehicle information DB 130 and reception log DB. 150 can be achieved by using storage devices such as HDD (Hard Disk Drive) and a flash memory.

FIG. 2 is a drawing showing an example of the notification screen to an operator displayed on the operator notification section 127. In FIG. 2, (a) shows an example of a notification screen 201 in the normal time when an alarm has not been issued. (b) shows a notification screen 202 of alarming time when other vehicle has entered the region where wireless communication is not available. (c) shows a notification screen 203 of other alarming time when other vehicle has entered the region where wireless communication is not available.

When there is no alarm in particular, the operator notification section 127 displays the location of the own vehicle 101 and the location of the other vehicles 102, 103 existing in the periphery of the own vehicle 101 on the notification screen 201 as shown in FIG. 2 (*a*). Meanwhile, when the other vehicle information from the other vehicle 102 has become non-receivable, the radio wave state monitoring section 126 determines that the other vehicle 102 has entered the region where wireless communication is not available, and outputs alarm information to the operator notification section 127. When this alarm information is received, the operator notification section 127 displays the notification screen 202 of the alarming time as shown in FIG. 2 (*b*) for example, and notifies the operator of the fact that the other vehicle 102 has entered the region where wireless communication is not available. Apart from the above, the notification screen 203 of the alarming time as shown in FIG. 2 (c) for example may be displayed on the operator notification section 127. On this notification screen 203, the region where wireless communication is not available estimated by the radio wave state monitoring section 126 is displayed as shown by the oblique line part in the drawing, and the vehicle 102 is displayed within the region. Thus, it is possible to display such screen that the operator can easily understand the location relation between the own vehicle 101 and the other vehicle 102.

FIG. 3 is a drawing showing a data format example of the wireless communication information 301 transmitted and received by the wireless communication section 123 of the safety driving assistance device 110. As shown in FIG. 3, the wireless communication information 301 is configured of a vehicle identifier 311, a vehicle type 312, a degree of latitude 313, a degree of longitude 314, a vehicle speed 315, a traveling direction 316, a vehicle direction 317, a vehicle height 317, and a vehicle status 319.

The vehicle identifier 311 is an identifier for uniquely identifying the vehicle of the transmission source. With respect to each vehicle used in the mine site, a value of the identifier not duplicating with each other is set beforehand in order to identify each vehicle uniquely. With respect to the vehicle identifier 311, a value of the identifier of a vehicle on which the safety driving assistance device 110 having transmitted the wireless communication information 301 is boarded is set.

The vehicle type 312 is an identifier for identifying the type of the vehicle of the transmission source. With respect to the vehicle type 312, a value is set which corresponds to the type of each vehicle such as a dump truck, wheel loader, grader, dozer, excavator, and light vehicle for example.

The degree of latitude 313 and the degree of longitude 314 are information showing the location of the vehicle of the transmission source. With respect to the degree of latitude 313 and the degree of longitude 314, a degree of latitude and a degree of longitude corresponding to the location of the vehicle in question in the mine measured by the location measuring section 122 are set respectively. Further, although the location of the vehicle of the transmission source is expressed by the degree of latitude 313 and the degree of longitude 314 in the example of FIG. 3, the location of the vehicle may be expressed using values other than the above. For example, it is also possible to arrange a reference point of the location within the mine and to express the location of the vehicle of the transmission source using values of an exclusive coordinate system which express the relative location with respect to the reference point, and so on.

The vehicle speed 315 is information showing the speed of the vehicle of the transmission source. The speed of the vehicle of the transmission source can be obtained based on the change amount of the location measured by the location measuring section 122 and the dynamic information acquired by the dynamic information acquiring section 121 for example.

The traveling direction 316 is information showing the traveling direction of the vehicle of the transmission source. The traveling direction of the vehicle of the transmission source can be obtained based on the direction of change of the location measured by the location measuring section 122 and the dynamic information acquired by the dynamic information acquiring section 121 for example.

The vehicle direction 317 is information showing the direction of the vehicle of the transmission source. For example, when the vehicle is traveling straight, the traveling direction 316 and the vehicle direction 317 become a same value. Meanwhile, when the vehicle is retracting, the difference of the value of the traveling direction 316 and the value of the vehicle direction 317 becomes 180 degrees, and the directions opposite to each other are shown.

The vehicle height 317 is information showing the height of the vehicle of the transmission source.

The vehicle status 319 is information showing the status of the vehicle of the transmission source. The content of the vehicle status expressed by this vehicle status 319 is set beforehand for each type of the vehicle shown by the vehicle type 312. For example, when the vehicle of the transmission source is a dump truck, a value corresponding to the loading status of the vehicle is set for the vehicle status 319. Also, when the vehicle of the transmission source is a light vehicle, a constant initial value is set for the vehicle status 319 irrespective of the vehicle status.

FIG. 4 is a drawing showing a configuration example of the vehicle information DB 130. As shown in FIG. 4, in the vehicle information DB 130, each data of a vehicle identifier 132, a vehicle type 133, a vehicle height 134, a degree of latitude 135, a degree of longitude 136, a vehicle speed 137, a traveling direction 138, a vehicle direction 139, a vehicle status 142, a reception time 140, and a managing status 141 are stored in each line corresponding to each vehicle. In FIG. 4, the data of the first line show the own vehicle information, and the data of the second and succeeding lines show the other vehicle information.

The vehicle identifier 132 is an identifier for uniquely identifying each vehicle data-managed in the vehicle information DB 130. As described above, with respect to each vehicle used in the mine site, a value of the identifier not duplicating with each other is set beforehand in order to identify each vehicle uniquely. In the case of the own vehicle information, as the identifier of the own vehicle, a value set beforehand is stored in the vehicle identifier 132. In the case of the other vehicle information, values set in the vehicle identifier 311 of FIG. 3 in the wireless communication information 301 received by the wireless communication section 123 are stored in the vehicle identifier 132.

The vehicle type 133 is an identifier for identifying the type of each vehicle data-managed in the vehicle information DB 130.

The vehicle height 134 is a datum showing the height of each vehicle data-managed in the vehicle information DB 130.

The degree of latitude 135 and the degree of longitude 136 are data showing the location of each vehicle data-managed in the vehicle information DB 130. In the case of the own vehicle information, values corresponding to the location of the own vehicle measured by the location measuring section 122 are stored in the degree of latitude 135 and the degree of longitude 136 respectively.

The vehicle speed 137 is a datum showing the speed of each vehicle data-managed in the vehicle information DB 130. In the case of the own vehicle information, the speed of the own vehicle is obtained based on the change amount of the location measured by the location measuring section 122 and the dynamic information acquired by the dynamic information acquiring section 121, and the value of the speed of the own vehicle is stored in the vehicle speed 137.

The traveling direction 138 is a datum showing the traveling direction of each vehicle data-managed in the vehicle information DB 130. Also, in the example of FIG. 4, the true north direction is taken as the reference direction, and the traveling direction of each vehicle is expressed by the angle from the reference direction with the clockwise direction being positive.

The vehicle direction 139 is a datum showing the direction of each vehicle data-managed in the vehicle information DB 130. Also, in the example of FIG. 4, similarly to the traveling direction 138, the true north direction is taken as the reference direction, and the direction of each vehicle is expressed by the angle from the reference direction with the clockwise direction being positive.

Figure 10:
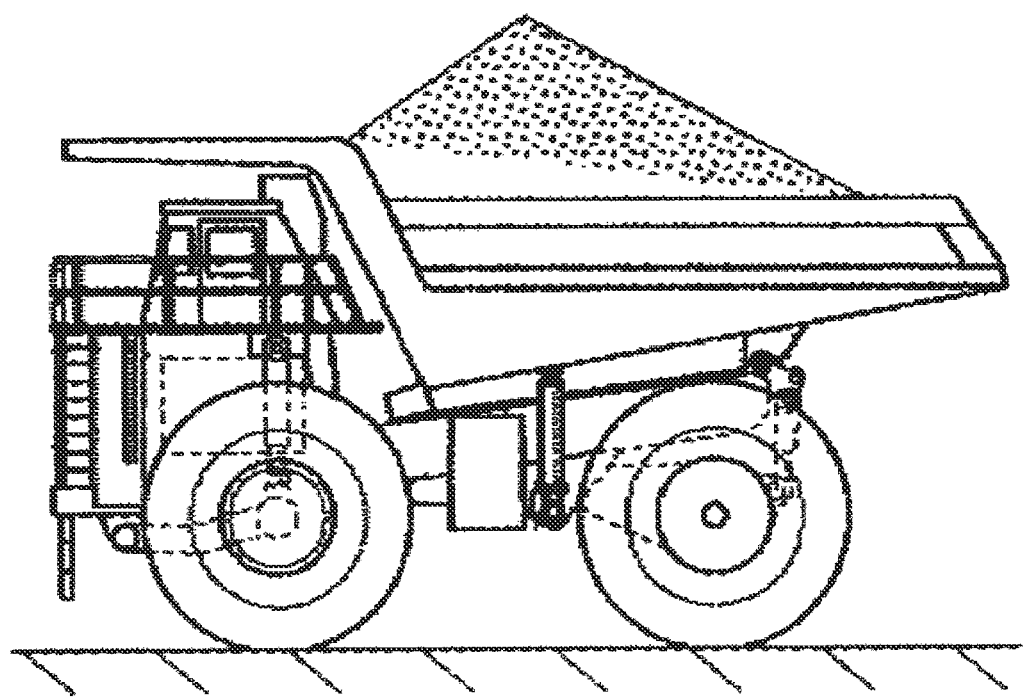
FIG. 10 is a drawing showing a dump truck in a loaded state.

The vehicle status 142 is a datum showing the status of each vehicle data-managed in the vehicle information DB 130. Similarly to the vehicle status 319 of FIG. 3, the content of the vehicle status expressed by this vehicle status 142 is set beforehand for each type of the vehicle shown by the vehicle type 133. Also, in the example of FIG. 4, when the vehicle type 133 is a dump truck, either of "0" showing "not yet loading" or "1" showing "with load" is stored in the vehicle status 142. "With load" shows a status where ore or soil has been loaded onto the vessel of the dump truck as shown in FIG. 10. Meanwhile, when the vehicle type 133 is other than the dump truck, "0" is stored in the vehicle status 142 in all cases. In the case of the own vehicle information, when the own vehicle is a dump truck, whether or not the status is "during loading" is determined based on the live load calculated using a pressure sensor as shown in Japanese Patent No. 5160468 for example, and a value corresponding to the determination result is stored in the vehicle status 142. Meanwhile, when the own vehicle is not a dump truck, a predetermined value is stored in the vehicle status 142. In the case of the other vehicle information, a value set in the vehicle status 319 of FIG. 3 in the wireless communication information 301 received by the wireless communication section 123 is stored in the vehicle status 142.

The reception time 140 is a datum showing the data generating time of each vehicle in the vehicle information DB 130. In the case of the own vehicle information, the calculation time of the value stored in the degree of latitude 135 and the degree of the longitude 136 respectively is stored in the reception time 140. In the case of the other vehicle information, the time when the wireless communication information 301 was received for the last time from the vehicle in question by the wireless communication section 123 is stored in the reception time 140.

The managing status 141 is a datum showing the data managing status of each vehicle in the vehicle information DB 130. In the example of FIG. 4, a case where the value of the managing status 141 is "0" shows that respective data of the line in question are in unused status. Meanwhile, a case where the value of the managing status 141 is "1" shows that respective data of the line in question have been periodically updated. Also, a case where the value of the managing status 141 is "2" shows that respective data of the line in question have not been updated for some time. In concrete terms, in the case of the own vehicle information, when respective data described above are updated based on the location and dynamic information of the own vehicle, "1" is set to the value of the managing status 141. Also, when a predetermined period of time or more elapses from the last updating, "2" is set to the value of the managing status 141. In the case of the other vehicle information, when respective data described above are updated based on the wireless communication information 301 received by the wireless communication section 123, "1" is set to the value of the managing status 141. Also, when a predetermined period of time or more elapses from the last updating, if the relative distance of the other vehicle in question with respect to the own vehicle is equal to or less than a predetermined threshold, "2" is set to the value of the managing status 141. In this case, it is estimated that the other vehicle in question exists in the region where wireless communication is not available in the periphery of the own vehicle. Meanwhile, when a predetermined period of time or more elapses from the last updating, if the relative distance of the other vehicle in question with respect to the own vehicle is equal to or greater than the threshold described above, "0" is set to the value of the managing status 141. In this case, it is estimated that the other vehicle in question exists at a location sufficiently apart from the own vehicle and wireless communication cannot reach. When "0" is set to the value of the managing status 141, all of the other vehicle information on the other vehicle in question is erased (reset) in the vehicle information DB 130.

Also, in the example of the vehicle information DB 130 shown in FIG. 4, the value of the vehicle identifier 132 of the own vehicle information stored in the first line is "101", and the value of the vehicle type 133 is "dump truck". Further, the values of the vehicle identifier 132 of the other vehicle information stored respectively in the second line and the third line are "102" and "103", and the values of the vehicle type 133 are "light vehicle" and "excavator". This expresses that, as shown in the system configuration example of FIG. 1, the other vehicle 102 that is a light vehicle and the other vehicle 103 that is an excavator exist in the periphery of the own vehicle 101, and the vehicle information of them is managed in the vehicle information DB 130. Also, all of the values of the managing status 141 of the vehicle information of them are "1". This expresses that both of the own vehicle information on the own vehicle 101 and the other vehicle information on the other vehicles 102, 103 have been updated periodically, and both of the other vehicles 102, 103 exist at locations where wireless communication with the own vehicle 101 is possible.

FIG. 5 is a drawing showing a configuration example of the reception log DB. 150. As shown in FIG. 5, the reception log DB. 150 is configured so that respective elements of a vehicle height 151, a vehicle type 152, a relative distance 153, an angle 154, a relative direction 155, a vehicle status 159, number of times 156, the number of successful reception 157, and a reception rate 158 are set in each line. Among these constituent elements, the vehicle height 151, vehicle type 152, relative distance 153, angle 154, relative direction 155, and vehicle status 159 are classification elements for classifying plural numbers of the other vehicles into plural groups according to respective features. To these classification elements, values that are predetermined so that combination becomes different for each line are set respectively. Meanwhile, the number of times 156, the number of successful reception 157, and reception rate 158 are log elements that express the reception log of the other vehicle information of each group classified by the classification elements described above. The values of these log elements are set respectively by processing of the radio wave state monitoring section 126, and are updated at every predetermined period.

The vehicle height 151 is a classification element on the height of the vehicle. In the reception log DB. 150, the height range of three kinds for example is set to the vehicle height 151 according to the height of the other vehicle to be classified. The radio wave state monitoring section 126 determines the height range shown in the vehicle height 151 into which each of the other vehicles falls based on the value of the vehicle height 134 in the other vehicle information of FIG. 4, and classifies each of the other vehicles according to the determination result.

The vehicle type 152 is a classification element on the type of the vehicle. In the reception log DB. 150, the vehicle type such as "light vehicle", "excavator", and "dump truck" for example is set to the vehicle type 152 according to the type of the other vehicle to be classified.

The relative distance 153 and the angle 154 are classification elements on the location of the vehicle. The radio wave state monitoring section 126 manages the region in the periphery of the own vehicle while dividing it into plural regions in order to identify the region where wireless communication is not available in the periphery of the own vehicle. In concrete terms, the region in the periphery of the own vehicle is divided into plural regions by dividing plural concentric circles centered on the own vehicle so as to be separated into a predetermined angle for example. In the reception log DB. 150, the ranges of the distance and the angle are respectively set to the relative distance 153 and the angle 154 corresponding to each of these divided regions. In other words, each of the divided regions in the periphery of the own vehicle can be identified using the values of the relative distance 153 and the angle 154. Also, when other region dividing method is employed, it is preferable to employ such value that can identify each of the regions divided by the method instead of the relative distance 153 and the angle 154.

The relative direction 155 is a classification element on the direction of the vehicle. In the reception log DB. 150, the angle range of four kinds for example is set to the relative direction 155 according to the direction of the other vehicle to be classified.

The vehicle status 159 is a classification element on the status of the vehicle. In the reception log DB. 150, the value such as "0" and "1" for example is set to the vehicle status 159 according to the status of the other vehicle to be classified.

The number of times 156 expresses the total of the number of times each of the other vehicles of the group corresponding to the line in question has transmitted the other vehicle information. When the other vehicle information stored in the vehicle information DB 130 is updated because the wireless communication information 301 has been received from the other vehicle, or when the wireless communication information 301 from the other vehicle could not be received even when a predetermined period of time elapsed after reception of the last time, the radio wave state monitoring section 126 increases the value of the number of times 156 of the group corresponding to the other vehicle in question.

The number of successful reception 157 expresses the number of successful reception of the other vehicle information transmitted from each of the other vehicles of the group corresponding to the line in question. When the other vehicle information stored in the vehicle information DB 130 has been normally updated by the wireless communication information 301 having been received from the other vehicle, the radio wave state monitoring section 126 increases the value of the number of successful reception 157 of the group corresponding to the other vehicle in question.

The reception rate 158 expresses the probability with which the other vehicle information transmitted from each of the other vehicles of the group corresponding to the line in question could be received normally. When the values of the number of times 156 and the number of successful reception 157 described above have been updated respectively, the radio wave state monitoring section 126 obtains the reception rate based on these values after the update, and updates the value of the reception rate 158 of the group in question. In the example shown in FIG. 5, out of the group where the vehicle type 152 is "light vehicle", in both of two groups where the angle range expressed by the angle 154 is "0-22.5" and "22.5-45", the value of the reception rate 158 is "1.0". Meanwhile, in two groups where the angle range expressed by the angle 154 is "125-147.5", the value of the reception rate 158 is "0.0" and "0.1". Thus, it is known that, when the other vehicle that is a light vehicle exists behind the own vehicle, the probability with which the own vehicle can normally receive the other vehicle information from the other vehicle is low. Also, when the vehicle type 152 is "dump truck", in two groups where the distance range expressed by the relative distance 153 is "0-5" and the angle range expressed by the angle 154 is "0-22.5", if the angle range expressed by the relative direction 155 differs, the value of the reception rate 158 changes from "1.0" to "0.7". Thus, it is known that, when the other vehicle is a dump truck, even when a vehicle exists at a same location, if the direction is different, the probability with which the other vehicle information can be normally received changes.

By using such reception log DB. 150 as described above, the radio wave state monitoring section 126 can calculate the reception rate 158 of wireless communication on plural regions set beforehand in the periphery of the own vehicle respectively based on the values of the number of times 156 and the number of successful reception 157 expressing the reception log of the other vehicle information of the past. Also, based on the classification elements such as the vehicle height 151, the vehicle type 152, the relative direction 155 with the own vehicle, and the vehicle status 159, plural other vehicles are classified into plural groups, and the reception rate 158 of the wireless communication can be calculated for each divided region identified by the values of the relative distance 153 and the angle 154 with respect to each of the groups. Also, the classification elements used in classifying other vehicles into groups are not limited to those cited in above explanation, and other classification elements may be used. Furthermore, it is not necessary to use all classification elements, and it is possible not to use optional classification elements.

FIG. 6 is a drawing showing a distribution example of a region where wireless communication is not available. FIG. 6 shows the location of the region where wireless communication is not available as seen from the own vehicle, the location being estimated by the radio wave state monitoring section 126. As described above, the radio wave state monitoring section 126 divides the region in the periphery of the own vehicle into plural regions according to the values of the relative distance 153 and the angle 154 explained in FIG. 5. Using the value of the reception rate 158 in each of these divided regions, whether wireless communication with the other vehicle is possible or hard is managed.

FIG. 6 (a) shows an example of a region distribution drawing 601 of a case where the region in the periphery of the own vehicle is divided into a concentric circle shape. Divided regions shown by hatching in the region distribution drawing 601 show the regions where the value of the reception rate 158 is lower than a predetermined threshold. In other words, this case shows that there exists a region where wireless communication is not available in the vicinity of the rear of the own vehicle. Also, the region distribution drawing 601 can be generated from the values of the reception rate 158 of respective groups where the vehicle type 152 is "light vehicle" in the reception log DB. 150 exemplified in FIG. 5.

FIG. 6 (b) shows an example of a region distribution drawing 602 of a case where the region in the periphery of the own vehicle is divided into a rectangular shape. Divided regions shown by hatching in the region distribution drawing 602 show the regions where the value of the reception rate 158 is lower than a predetermined threshold. In other words, this case shows that there exists a region where wireless communication is not available in the vicinity of the right front of the own vehicle. Also, when the region distribution drawing 602 is used, each divided region identified by the values of the relative distance 153 and the angle 154 in the reception log DB. 150 exemplified in FIG. 5 should be associated with each divided region of the region distribution drawing 602.

Figure 7:
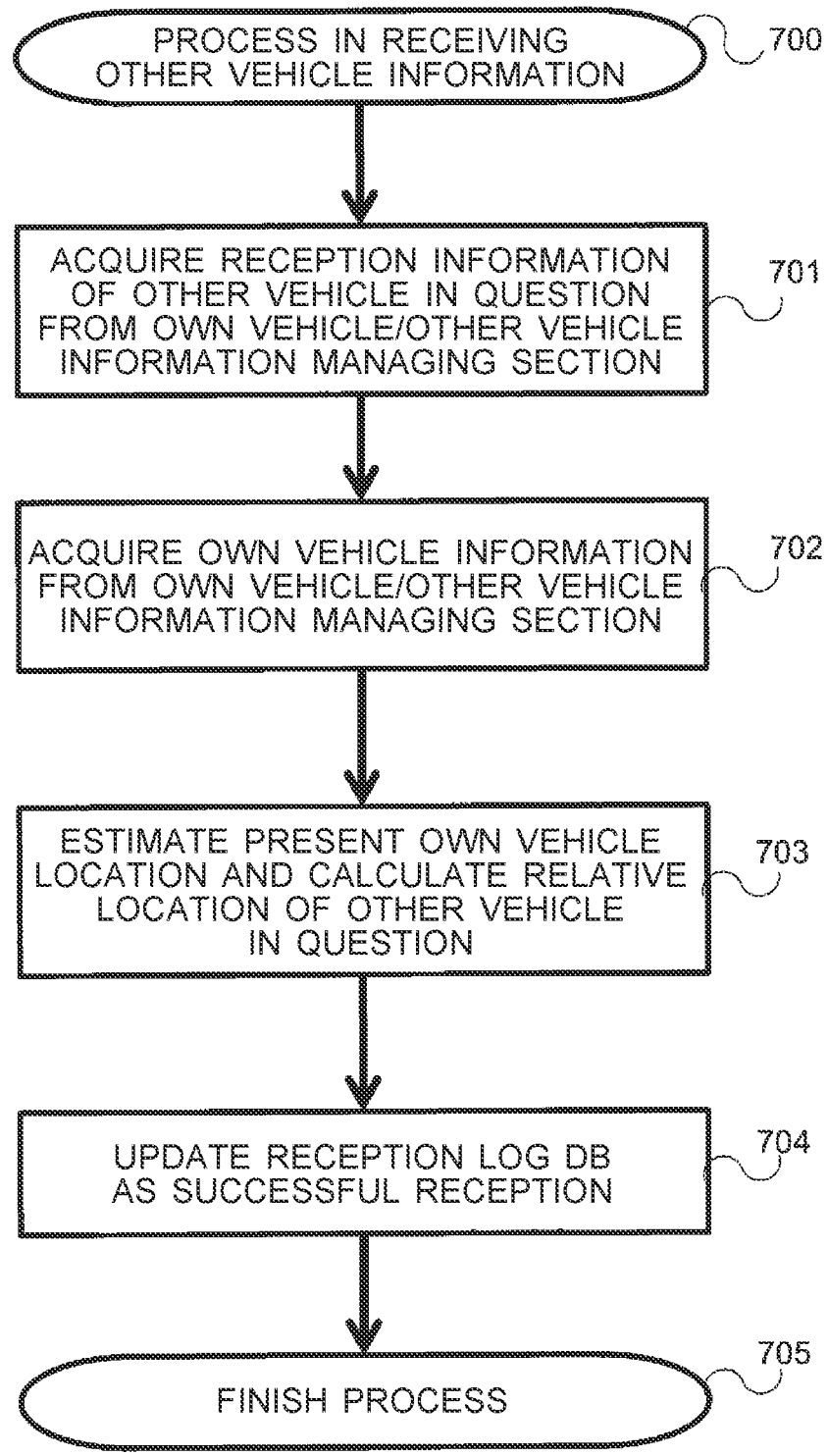
FIG. 7 is a process flow diagram of a radio wave state monitoring section at the time of reception of wireless communication.

FIG. 7 is a process flow diagram of the radio wave state monitoring section 126 at the time of reception of wireless communication. The radio wave state monitoring section 126 can execute the process shown in the process flow of FIG. 7 by executing by a computer a predetermined program stored beforehand when the wireless communication section 123 has received the wireless communication information 301.

When the wireless communication information 301 (other vehicle information) is received from the other vehicle, the wireless communication section 123 demodulates the wireless communication information 301 and outputs the demodulated wireless communication information 301 to the own vehicle/other vehicle information managing section 124 in such format as shown in FIG. 3. The own vehicle/other vehicle information managing section 124 updates the vehicle information DB 130 using the other vehicle information outputted from the wireless communication section 123. At this time, when the value of the managing status 141 of FIG. 4 is "1" or "2" and there exists a line whose value of the vehicle identifier 132 agrees with the vehicle identifier 311 of FIG. 3 in the vehicle information DB 130, the own vehicle/other vehicle information managing section 124 overwrites respective data of the line based on the content of the other vehicle information having been received, and sets the managing status 141 to "1". Meanwhile, when there exists no line whose value of the vehicle identifier 132 agrees with the vehicle identifier 311 among the lines whose value of the managing status 141 is "1" or "2", the own vehicle/other vehicle information managing section 124 sets respective data of the other vehicle information having been received to an appropriate line whose value of the managing status 141 is "0", and sets the managing status 141 to "1". When the vehicle information DB 130 has been updated, the own vehicle/other vehicle information managing section 124 notifies the radio wave state monitoring section 126 of the event.

When an update notification of the vehicle information DB 130 is received from the own vehicle/other vehicle information managing section 124, the radio wave state monitoring section 126 starts the process of FIG. 7 (step 700). The radio wave state monitoring section 126 acquires updated other vehicle information from the own vehicle/other vehicle information managing section 124 (step 701). The radio wave state monitoring section 126 further acquires the own vehicle information from the own vehicle/other vehicle information managing section 124 (step 702).

The radio wave state monitoring section 126 estimates the present location of the own vehicle based on the own vehicle information acquired in step 702 (step 703). At this time, the radio wave state monitoring section 126 estimates the present location of the own vehicle based on various information included in the own vehicle information, namely the information such as the degree of latitude, degree of longitude, reception time, vehicle speed, and traveling direction for example. When the location of the own vehicle has been estimated thus, the radio wave state monitoring section 126 calculates the relative location of the other vehicle with respect to the own vehicle based on the location of the own vehicle estimated and the other vehicle information acquired in step 701 (step 703). At this time, the radio wave state monitoring section 126 estimates the present location of the other vehicle based on various information included in the other vehicle information, namely the information such as the degree of latitude, degree of longitude, reception time, vehicle speed, and traveling direction for example. Also, the radio wave state monitoring section 126 calculates, based on the location of the own vehicle and the location of the other vehicle having been estimated, the relative distance between the own vehicle and the other vehicle, the direction along which the other vehicle exists when the traveling direction of the own vehicle is used as the reference, the traveling direction of the other vehicle when the traveling direction of the own vehicle is used as the reference, and so on. Thus, the radio wave state monitoring section 126 calculates the relative location of the other vehicle with respect to the own vehicle.

The radio wave state monitoring section 126 updates the reception log DB. 150 based on the relative location of the other vehicle calculated in step 703 (step 704). At this time, the radio wave state monitoring section 126 identifies to which line the other vehicle in question corresponds in the reception log DB. 150 using the classification elements of the vehicle height 151, vehicle type 152, relative distance 153, angle 154, relative direction 155, and vehicle status 159 of FIG. 5 based on the other vehicle information acquired in step 701 and the relative location of the other vehicle calculated in step 703. Thus, the radio wave state monitoring section 126 classifies the other vehicle in question into an appropriate group. Also, the radio wave state monitoring section 126 updates the values of the number of times 156 and the number of successful reception 157 in the identified line (group), by adding 1 each to these values. Further, the radio wave state monitoring section 126 calculates the value of new reception rate 158 by dividing the value of the updated number of times 156 by the updated value of the number of successful reception 157, and updates the value of reception rate 158 using the thus calculated value.

When the reception log DB. 150 is updated in step 704, the radio wave state monitoring section 126 finishes the process flow of FIG. 7 (step 705). Thereafter, the radio wave state monitoring section 126 waits until new wireless communication information 301 is received by the wireless communication section 123.

Figure 8:
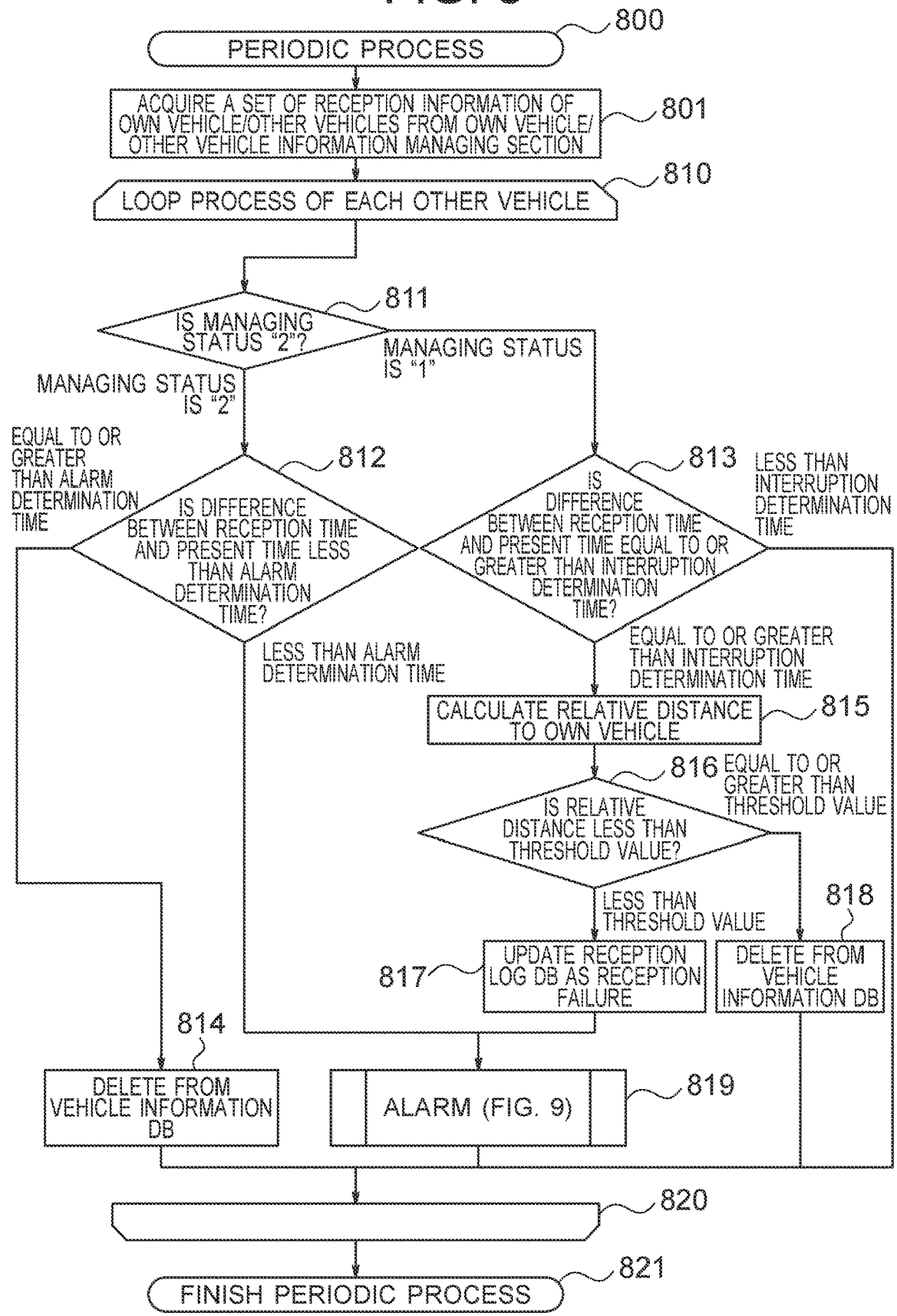
FIG. 8 is a periodic process flow diagram of the radio wave state monitoring section.

FIG. 8 is a periodic process flow diagram of the radio wave state monitoring section 126.

The radio wave state monitoring section 126 starts execution of the process shown in this FIG. 8 for every constant processing period set beforehand (step 800).

The radio wave state monitoring section 126 acquires a set of information of the own vehicle and the reception information from the other vehicles from the own vehicle/other vehicle information managing section 124 (step 801). In concrete terms, the radio wave state monitoring section 126 acquires both of the own vehicle information stored in the first line in the vehicle information DB 130 of FIG. 4 and the other vehicle information whose value of the managing status 141 is "1" or "2" out of the other vehicle information stored in the second and succeeding lines from the own vehicle/other vehicle information managing section 124.

When required information has been acquired in step 801, the radio wave state monitoring section 126 executes a loop process in which processes from step 811 to step 819 explained below are executed for respective other vehicles (step 810, step 820). When execution of the loop process has been finished for all other vehicles that have acquired the other vehicle information, the radio wave state monitoring section 126 finishes the process flow of FIG. 8 (step 821).

In the loop process, the radio wave state monitoring section 126 selects some other vehicle as a processing object, and confirms whether the value of the managing status 141 of the other vehicle information acquired in step 801 on the other vehicle in question is "2" (step 811). As a result, when the value of the managing status 141 is "2", the process proceeds to step 812. If it is not the case, namely when the value of the managing status 141 is "1", the process proceeds to step 813.

When the process proceeds from step 811 to step 812, the radio wave state monitoring section 126 determines whether or not the difference between the reception time of the other vehicle information from the other vehicle in question and the present time is less than a predetermined alarm determination time (step 812). At this time, the radio wave state monitoring section 126 can identify the reception time of the other vehicle information from the value of the reception time 140 of the other vehicle information acquired in step 801. As a result, when the difference between the reception time and the present time is less than the alarm determination time, the process proceeds to step 819. If it is not the case, namely when the difference between the reception time and the present time is equal to or greater than the alarm determination time, the process proceeds to step 814.

When the process proceeds from step 812 to step 814, the radio wave state monitoring section 126 deletes the other vehicle information on the other vehicle in question from the vehicle information DB 130 (step 814). At this time, the radio wave state monitoring section 126 sets the value of the managing status 141 to "0" for the line showing the other vehicle information of the other vehicle in question in the vehicle information DB 130, and erases (resets) all values of other respective data. When step 814 has been executed, the radio wave state monitoring section 126 finishes the loop process for the other vehicle in question.

When the process proceeds from step 811 to step 813, the radio wave state monitoring section 126 determines whether or not the difference between the reception time of the other vehicle information from the other vehicle in question and the present time is equal to or greater than a predetermined interruption determination time (step 813). At this time, the radio wave state monitoring section 126 can identify the reception time of the other vehicle information from the value of the reception time 140 of the other vehicle information acquired in step 801 similarly to step 812 described above. As a result, when the difference between the reception time and the present time is equal to or less than the interruption determination time, the radio wave state monitoring section 126 determines that wireless communication has not yet been interrupted between the own vehicle and the other vehicle in question, and finishes the loop process for the other vehicle in question. Meanwhile, when the difference between the reception time and the present time is equal to or greater than the interruption determination time, the radio wave state monitoring section 126 determines that wireless communication has been interrupted between the own vehicle and the other vehicle in question, and proceeds the process to step 815.

When the process proceeds from step 813 to step 815, the radio wave state monitoring section 126 calculates the relative distance between the other vehicle in question and the own vehicle (step 815). At this time, the radio wave state monitoring section 126 estimates the present location of the own vehicle and the other vehicle in question respectively from the values of the degree of latitude 135, degree of longitude 136, reception time 140, vehicle speed 137, and traveling direction 138 in each of the own vehicle information and the other vehicle information acquired in step 801, and calculates the distance between the own vehicle and the other vehicle in question. Thus, the relative distance of the other vehicle in question with respect to the own vehicle can be calculated.

When the relative distance has been calculated in step 815, the radio wave state monitoring section 126 determines whether or not the relative distance is equal to or less than a predetermined threshold (step 816). As a result, when the relative distance is equal to or less than the threshold, the radio wave state monitoring section 126 determines that the other vehicle in question has entered a region where wireless communication is not available in the periphery of the own vehicle, and proceeds the process to step 817. Meanwhile, when the relative distance is equal to or greater than the threshold, the radio wave state monitoring section 126 determines that wireless communication is impossible because the other vehicle in question exists at a location apart from the own vehicle, and proceeds the process to step 818.

When the process proceeds from step 816 to step 817, the radio wave state monitoring section 126 determines that reception of the other vehicle information on the other vehicle in question has failed, and updates the vehicle information DB 130 (step 817). At this time, the radio wave state monitoring section 126 sets the value of the managing status 141 to "2" for the line showing the other vehicle information of the other vehicle in question in the vehicle information DB 130. Also, the radio wave state monitoring section 126 calculates the relative distance, angle, and relative direction of the other vehicle in question with respect to the own vehicle from the present location of the own vehicle and the other vehicle in question calculated in step 815, and, using the calculation result of them and the values of the vehicle type 133, vehicle height 134, and vehicle status 142 in the other vehicle information, and retrieves the line (group) corresponding to the other vehicle in question within the reception log DB. 150. As a result, if the radio wave state monitoring section 126 can retrieve the corresponding line, and updates the value of the number of times 156 in the line by adding 1, and calculates the value of new reception rate 158 by dividing the value of the updated number of times 156 by the value of the number of successful reception 157, and updates the value of the reception rate 158 using the thus calculated value. When step 817 has been executed, the radio wave state monitoring section 126 makes the process proceed to step 819.

When the process proceeds from step 812 or step 817 to step 819, the radio wave state monitoring section 126 executes an alarm process for preventing collision of the own vehicle and the other vehicle in question. Details of this alarm process will be explained below referring to the process flow of FIG. 9. When the alarm process has been executed in step 819, the radio wave state monitoring section 126 finishes the loop process for the other vehicle in question.

When the process proceeds from step 816 to step 818, the radio wave state monitoring section 126 deletes the other vehicle information on the other vehicle in question from the vehicle information DB 130 (step 818). At this time, similarly to step 814 described above, the radio wave state monitoring section 126 sets the value of the managing status 141 to "0" for the line showing the other vehicle information of the other vehicle in question in the vehicle information DB 130, and erases (resets) all values of other respective data. When step 818 has been executed, the radio wave state monitoring section 126 finishes the loop process for the other vehicle in question.

By executing the process described above, when the difference between the reception time and the present time has been determined to be equal to or greater than the interruption determination time in step 813 and the relative distance has been determined to be equal to or less than the threshold in step 816, the radio wave state monitoring section 126 can determine that wireless communication between the own vehicle and the other vehicle in question has been interrupted by entry of the other vehicle in question to the region where wireless communication is not available. In this case, until it is determined thereafter that the difference between the reception time and the present time is equal to or greater than the alarm determination time in step 812, the radio wave state monitoring section 126 can continuously execute the alarm process of step 819 at every predetermined period. Also, the time when the alarm process is executed then (alarm time) is determined from the difference between the alarm determination time and the interruption determination time. When wireless communication with the other vehicle in question is restarted after a lapse of the alarm time or within the alarm time, the radio wave state monitoring section 126 determines that the difference between the reception time and the present time is equal to or greater than the alarm determination time in step 812, or determines that the difference between the reception time and the present time is equal to or less than the interruption determination time in step 813. As a result, execution of the alarm process of step 819 for the other vehicle in question is stopped.

Figure 9:
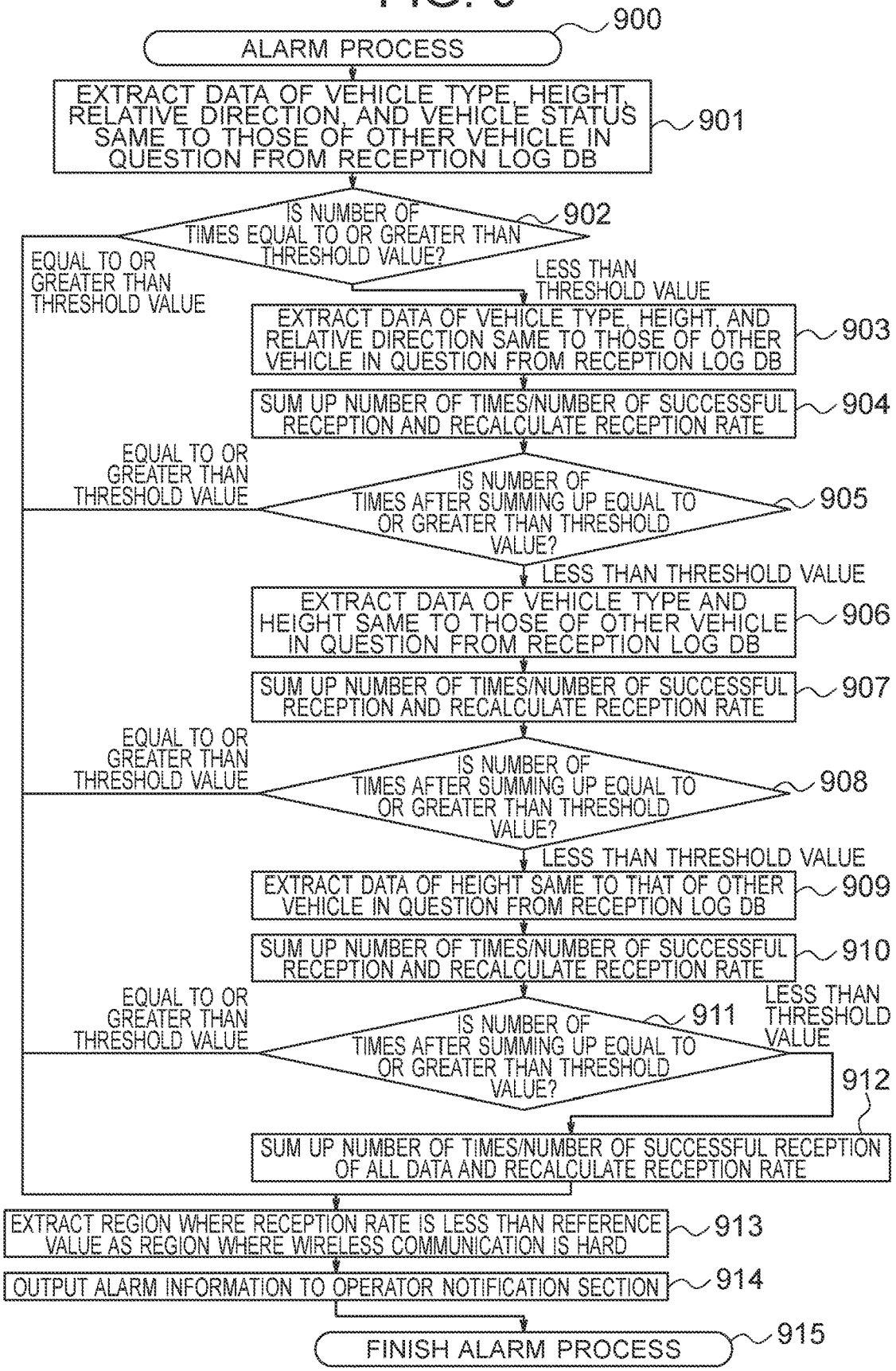
FIG. 9 is a process flow diagram showing a flow of the alarm process in the first embodiment of the present invention.

FIG. 9 is a process flow diagram showing a flow of the alarm process in the first embodiment of the present invention. The radio wave state monitoring section 126 starts execution of the process shown in this FIG. 9 in step 819 of FIG. 8 (step 900).

The radio wave state monitoring section 126 extracts the data of each divided region in which all conditions of the vehicle height, vehicle type, relative direction, and vehicle status agree with those of the other vehicle having been selected as the processing object from the reception log DB. 150 (step 901). In other words, in step 901, the radio wave state monitoring section 126 extracts from the reception log DB. 150 the data of each line (group) where the values of the vehicle height 151, vehicle type 152, and vehicle status 159 correspond to the height, type, and status of the other vehicle in question obtained from the other vehicle information acquired in step 801 of FIG. 8 and where the relative direction 155 corresponds to the relative direction of the other vehicle calculated from the direction of the own vehicle and other vehicle information acquired in step 801 of FIG. 8.

The radio wave state monitoring section 126 determines whether or not the value of the number of times 156 is equal to or greater than a predetermined threshold with respect to all lines where the data have been extracted in step 901 (step 902). As a result, the radio wave state monitoring section 126 proceeds the process to step 913 when the value of the number of times 156 is equal to or greater than the threshold in all lines, and proceeds the process to step 903 when the value of the number of times 156 is less than the threshold in at least one line.

When the process proceeds from step 902 to step 903, the radio wave state monitoring section 126 extracts from the reception log DB. 150 the data of each divided region where each condition of the vehicle height, vehicle type, and relative direction agree with those of the other vehicle selected as the processing object (step 903). In other words, in step 903, the radio wave state monitoring section 126 extracts from the reception log DB. 150 the data of each line (group) where the vehicle status differs from that of the other vehicle in question in addition to the data of each line (group) having been extracted in step 901. In the data extracted then, the values of the vehicle height 151 and vehicle type 152 respectively correspond to the height and type of the other vehicle in question obtained from the other vehicle information acquired in step 801 of FIG. 8, and the values of the relative direction 155 respectively correspond to the relative direction of the other vehicle in question obtained from the other vehicle information and the own vehicle information acquired in step 801 of FIG. 8; however, the values of the vehicle status 159 include those that do not correspond to the status of the other vehicle in question.

When the data have been extracted in step 903, the radio wave state monitoring section 126 sums up the values of the number of times 156 and the number of successful reception 157 for each divided region, and recalculates the value of the reception rate 158 (step 904). In other words, in step 904, the radio wave state monitoring section 126 sums up the values of the number of times 156 and the number of successful reception 157 included in each line (group) where the values of the vehicle height 151, vehicle type 152, and relative direction 155 respectively agree and where the values of the vehicle status 159 differ for each combination of the relative distance 153 and angle 154 respectively. Also, the radio wave state monitoring section 126 recalculates the value of the reception rate 158 after summing-up for each divided region by dividing each of the obtained total values of the number of successful reception 157 by each total value of the number of times 156. Thus, the radio wave state monitoring section 126 merges groups where the values of the vehicle height 151, vehicle type 152, and relative direction 155 are equal to those of the other vehicle in question and the value of the vehicle status 159 differs from that of the other vehicle in question in the reception log DB. 150, and recalculates the reception rate of each divided region.

The radio wave state monitoring section 126 determines whether or not all of the total values of the number of times 156 obtained in step 904 is equal to or greater than a predetermined threshold (step 905). As a result, the radio wave state monitoring section 126 proceeds the process to step 913 when all of the values of the number of times 156 after summing-up is equal to or greater than the threshold, and proceeds the process to step 906 when at least one value of the number of times 156 after summing-up is less than the threshold.

When the process proceeds from step 905 to step 906, the radio wave state monitoring section 126 extracts from the reception log DB. 150 the data of each divided region where each condition of the vehicle height and vehicle type agrees with that of the other vehicle selected as the processing object (step 906). In other words, in step 906, the radio wave state monitoring section 126 extracts from the reception log DB. 150 the data of each line (group) where the direction differs from that of the other vehicle in question in addition to the data of each line (group) extracted in step 903. In the data extracted then, although the values of the vehicle height 151 and vehicle type 152 respectively correspond to the height and type of the other vehicle in question obtained from the other vehicle information acquired in step 801 of FIG. 8, the values of the relative direction 155 and vehicle status 159 include those not corresponding to the direction and status of the other vehicle in question.

When the data have been extracted in step 906, the radio wave state monitoring section 126 sums up the values of the number of times 156 and the number of successful reception 157 for each divided region, and recalculates the value of the reception rate 158 (step 907). In other words, in step 907, the radio wave state monitoring section 126 sums up the values of the number of times 156 and the number of successful reception 157 included in each line (group) where the values of the vehicle height 151 and vehicle type 152 respectively agree and the value of at least one of the relative direction 155 and vehicle status 159 differs for each combination of the relative distance 153 and angle 154 respectively. Also, the radio wave state monitoring section 126 recalculates the value of the reception rate 158 after summing-up for each divided region by dividing each of the obtained total values of the number of successful reception 157 by each total value of the number of times 156. Thus, the radio wave state monitoring section 126 merges groups where the values of the vehicle height 151 and vehicle type 152 are equal to those of the other vehicle in question and where the value of at least one of the relative direction 155 and vehicle status 159 differs from that of the other vehicle in question in the reception log DB. 150, and recalculates the reception rate of each divided region.

The radio wave state monitoring section 126 determines whether or not all of the total values of the number of times 156 obtained in step 907 is equal to or greater than a predetermined threshold (step 908). As a result, the process proceeds to step 913 when all of the values of the number of times 156 after summing-up is equal to or greater than the threshold, and the process proceeds to step 909 when at least one value of the number of times 156 after summing-up is less than the threshold.

When the process proceeds from step 908 to step 909, the radio wave state monitoring section 126 extracts from the reception log DB. 150 the data of each divided region where the condition of the vehicle height agrees with that of the other vehicle selected as the processing object (step 909). In other words, in step 906, the radio wave state monitoring section 126 extracts from the reception log DB. 150 the data of each line (group) where the vehicle type differs from that of the other vehicle in question in addition to the data of each line (group) extracted in step 906. In the data extracted then, although the value of the vehicle height 151 corresponds to the height of the other vehicle in question obtained from the other vehicle information acquired in step 801 of FIG. 8, the values of the vehicle type 152, relative direction 155, and vehicle status 159 include those not corresponding to the type, direction, and status of the other vehicle in question.

When the data have been extracted in step 909, the radio wave state monitoring section 126 sums up the values of the number of times 156 and the number of successful reception 157 for each divided region, and recalculates the value of the reception rate 158 (step 910). In other words, in step 910, the radio wave state monitoring section 126 sums up the values of the number of times 156 and the number of successful reception 157 included in each line (group) where the values of the vehicle height 151 agree and the value of at least one of the vehicle type 152, relative direction 155, and vehicle status 159 differs for each combination of the relative distance 153 and angle 154 respectively. Also, the radio wave state monitoring section 126 recalculates the value of the reception rate 158 after summing-up for each divided region by dividing each of the obtained total values of the number of successful reception 157 by each total value of the number of times 156. Thus, the radio wave state monitoring section 126 merges groups where the value of the vehicle height 151 is equal to that of the other vehicle in question and the value of at least one of the vehicle type 152, relative direction 155, and vehicle status 159 differs from that of the other vehicle in question in the reception log DB. 150, and recalculates the reception rate of each divided region.

The radio wave state monitoring section 126 determines whether or not all of the total values of the number of times 156 obtained in step 910 is equal to or greater than a predetermined threshold (step 911). As a result, the radio wave state monitoring section 126 proceeds the process to step 913 when all of the values of the number of times 156 after summing-up is equal to or greater than the threshold, and proceeds the process to step 912 when at least one value of the number of times 156 after summing-up is less than the threshold.

When the process proceeds from step 911 to step 912, the radio wave state monitoring section 126 sums up the values of the number of times 156 and the number of successful reception 157 for each divided region with respect to all data within the reception log DB. 150, and recalculates the value of the reception rate 158 (step 912). In other words, in step 912, the radio wave state monitoring section 126 sums up the values of the number of times 156 and the number of successful reception 157 included in each line (group) where the value of at least one of the vehicle height 151, vehicle type 152, relative direction 155, and vehicle status 159 differs for each combination of the relative distance 153 and angle 154 respectively. Also, the radio wave state monitoring section 126 recalculates the value of the reception rate 158 after summing-up for each divided region by dividing each of the obtained total values of the number of successful reception 157 by each total value of the number of times 156. Thus, the radio wave state monitoring section 126 merges groups where the value of at least one of the vehicle height 151, vehicle type 152, relative direction 155, and vehicle status 159 differs in the reception log DB. 150, and recalculates the reception rate of each divided region. When step 912 has been executed, the radio wave state monitoring section 126 proceeds the process to step 913.

The radio wave state monitoring section 126 determines whether or not each of the value of the reception rate 158 in the data of each line extracted in step 901 described above or the value of the reception rate 158 after summing-up recalculated in any of steps 904, 907, 910, and 912 is less than a predetermined reference value for each combination of the relative distance 153 and angle 154, namely for each divided region. As a result, when there is a combination of the relative distance 153 and angle 154 where the reception rate is less than the reference value, the radio wave state monitoring section 126 determines the divided region identified by the combination is a region where wireless communication is not available in the periphery of the own vehicle and extracts it (step 913).

When step 913 has been executed, the radio wave state monitoring section 126 outputs alarm information on the other vehicle in question to the operator notification section 127 (step 914). At this time, the radio wave state monitoring section 126 generates the alarm information based on information showing the relative location of the other vehicle in question with respect to the own vehicle and so on and information showing the region where wireless communication is not available extracted in step 913, and outputs the alarm information to the operator notification section 127. Based on this alarm information, the operator notification section 127 executes alarming by notifying the operator of the own vehicle of the region where wireless communication is not available. When step 914 has been executed, the radio wave state monitoring section 126 finishes the alarm process of FIG. 9 (step 915).

According to the first embodiment of the present invention explained above, actions and effects below are exerted.

(1) The safety driving assistance device 110 that is an on-board terminal device includes the location measuring section 122 that measures the location of the own vehicle, the wireless communication section 123 that transmits the own vehicle information including the location information of the own vehicle to the other vehicles and receives the other vehicle information including the location information of the other vehicles from the other vehicles by execution of wireless communication with the other vehicles, and the radio wave state monitoring section 126. The radio wave state monitoring section 126 estimates the location of the other vehicles and calculates the relative distance between the own vehicle and the other vehicles (step 815) when wireless communication with the other vehicles has been interrupted, and, when this relative distance is less than a predetermined threshold, executes an alarm process (step 819) for preventing collision of the own vehicle and the other vehicles. With such configuration, even when there exists a region where wireless communication is not available in the periphery of the own vehicle, collision of the own vehicle and the other vehicles can be surely prevented.

(2) The safety driving assistance device 110 further includes the operator notification section 127 that executes notification on the other vehicles to the operator of the own vehicle. The radio wave state monitoring section 126 outputs the alarm information including the information on the region where wireless communication is not available in the periphery of the own vehicle to the operator notification section 127 in the alarm process (step 914). Based on this alarm information, the operator notification section 127 notifies the operator of the own vehicle of the region where wireless communication is not available. With such configuration, when there exists a region where wireless communication is not available in the periphery of the own vehicle, the region can be surely notified to the operator of the own vehicle to draw attention.

(3) The radio wave state monitoring section 126 has the reception log DB. 150, and calculates the reception rate of wireless communication respectively for plural divided regions set beforehand in the periphery of the own vehicle as shown in FIG. 6 based on the values of the number of times 156 and the number of successful reception 157 expressing the reception log of the other vehicle information of the past accumulated in this reception log DB. 150. Also, out of plural divided regions, the radio wave state monitoring section 126 determines the divided region where the reception rate of wireless communication is less than a predetermined reference value is a region where wireless communication is not available (step 913). With such configuration, the region where wireless communication is not available existing in the periphery of the own vehicle can be surely and precisely identified.

(4) The wireless communication section 123 executes wireless communication with the plural other vehicles 102, 103 respectively. The radio wave state monitoring section 126 classifies the plural other vehicles 102, 103 into plural groups based on the predetermined classification elements, and calculates the reception rate 158 of wireless communication for each divided region expressed by a combination of the values of the relative distance 153 and angle 154 with respect to each of the groups. This classification element can include at least either one of the vehicle height 151, vehicle type 152, relative direction 155 with own vehicle, and vehicle status 159. With such configuration, the reception rate of wireless communication can be precisely calculated for each divided region considering the feature of each vehicle.

(5) The radio wave state monitoring section 126 determines whether or not the total value of the reception number of times of the other vehicle information from respective other vehicles included in the same group of the other vehicle with which wireless communication has been interrupted is less than a predetermined threshold based on the value of the number of times 156 in each line of the reception log DB. 150 (steps 902, 905, 908, 911). As a result, when the total value of the reception number of times is less than the threshold, the radio wave state monitoring section 126 merges the group in question and other groups, and calculates the reception rate of wireless communication (steps 904, 907, 910, 912). With such configuration, even when the reception number of times of the other vehicle information is insufficient for calculating the reception rate, the reception rate can be calculated semi-precisely.

(6) When execution of the alarm process is started in step 819 after it is determined that wireless communication has been interrupted in step 813, during the period of the alarm time from that time point until when it is determined that the difference between the reception time and the present time is equal to or less than a predetermined alarm determination time in step 812, the radio wave state monitoring section 126 executes the alarm process continuously. Such an alarm time is determined from the difference between the alarm determination time used in determination of step 812 and the interruption determination time used in determination of step 813. Meanwhile, when wireless communication is restarted after a lapse of the alarm time or within the alarm time, the radio wave state monitoring section 126 determines that the difference between the reception time and the present time is equal to or greater than the alarm determination time in step 812, or determines that the difference between the reception time and the present time is equal to or less than the interruption determination time in step 813. Thus, the radio wave state monitoring section 126 stops execution of the alarm process of step 819. With such configuration, execution of the alarm process can be started and stopped at proper timing.

Second Embodiment

Figure 11:
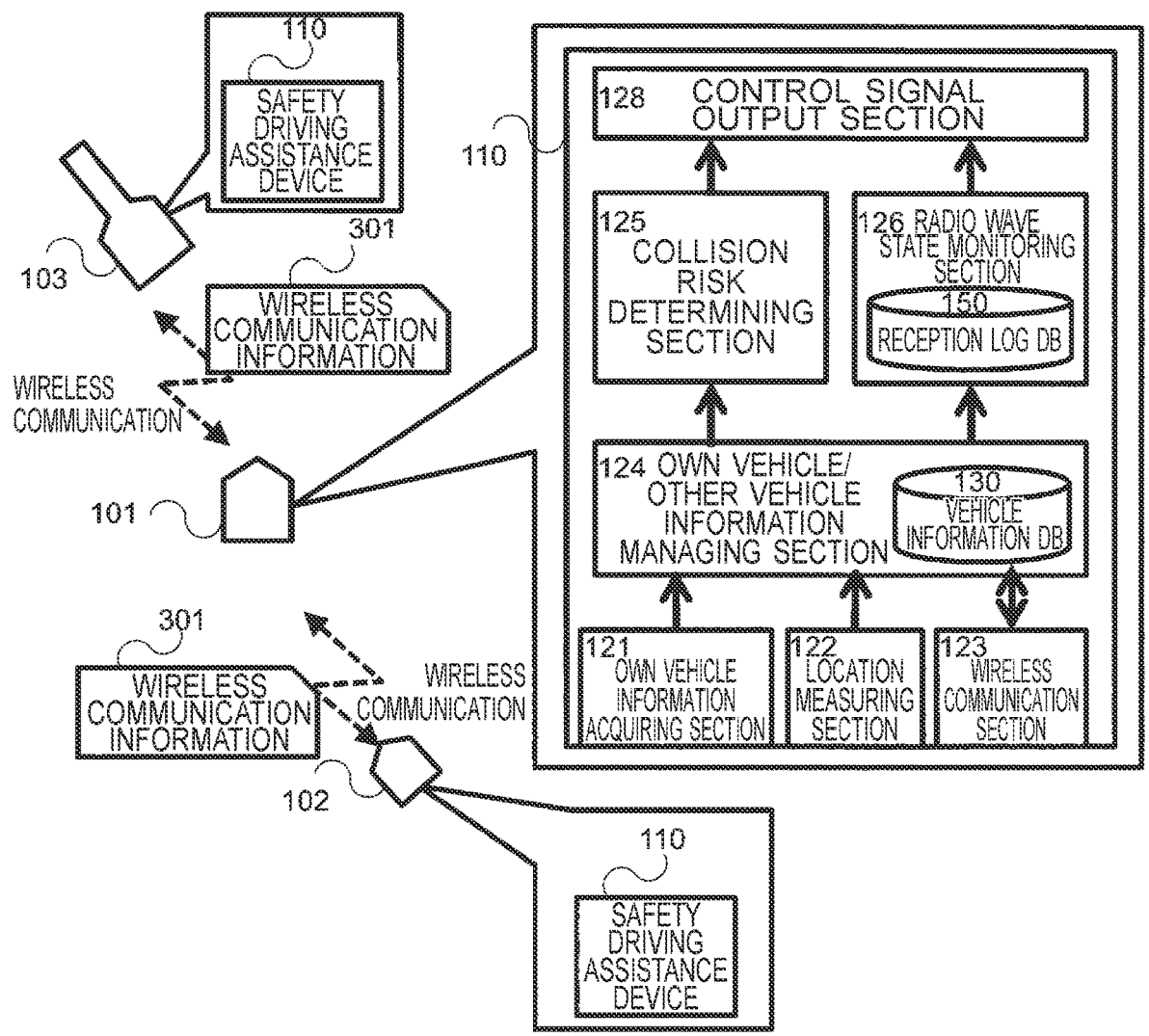
FIG. 11 is a drawing showing a configuration of a safety driving assistance system including a safety driving assistance device that is an application example of an on-board terminal device related to the second embodiment of the present invention.

FIG. 11 is a drawing showing a configuration of a safety driving assistance system including a safety driving assistance device that is an application example of an on-board terminal device related to the second embodiment of the present invention. Compared with the safety driving assistance system according to the first embodiment of the present invention shown in FIG. 1, the safety driving assistance system shown in FIG. 11 is different in terms that the safety driving assistance device 110 includes a control signal output section 128 instead of the operator notification section 127.

The control signal output section 128 outputs a control signal to the own vehicle, the control signal being for executing travel control of the own vehicle so as to avoid collision of the own vehicle and the other vehicles based on the determination result of the collision risk notified from the collision risk determining section 125 and the alarm information outputted from the radio wave state monitoring section 126. The control signal output section 128 can output a control signal instructing braking to the own vehicle and a control signal instructing the direction for avoiding the other vehicle having a risk of collision with the own vehicle to the own vehicle for example as a control signal for executing travel control of the own vehicle.

In the present embodiment, although the radio wave state monitoring section 126 executes a process similar to that of the first embodiment explained in FIGS. 7, 8 respectively, the radio wave state monitoring section 126 executes a process different from that of the first embodiment only in the alarm process executed in step 819 of FIG. 8. Below, the alarm process executed in the present embodiment will be explained.

FIG. 12 is a process flow diagram showing a flow of the alarm process in the second embodiment of the present invention. In step 819 of FIG. 8, the radio wave state monitoring section 126 starts execution of the process shown in this FIG. 12 (step 900).

In steps 901-913, the radio wave state monitoring section 126 executes processes similar to those of the first embodiment explained in FIG. 9 respectively.

When step 913 has been executed, the radio wave state monitoring section 126 outputs alarm information on the other vehicle in question to the control signal output section 128 (step 914A). At this time, the radio wave state monitoring section 126 generates alarm information based on information showing the relative location of the other vehicle in question with respect to the own vehicle and so on and information showing the region where wireless communication is not available extracted in step 913, and outputs the alarm information to the control signal output section 128. Based on this alarm information, the control signal output section 128 outputs to the own vehicle a control signal of a case where the other vehicle exists in the region where wireless communication is not available. When step 914A has been executed, the radio wave state monitoring section 126 finishes the alarm process of FIG. 12 (step 915).

According to the second embodiment of the present invention explained above, actions and effects similar to those of (1), (3)-(6) explained in the first embodiment are exerted. Also, instead of the action and effect of (2), actions and effects of (7) described below are exerted.

(7) The safety driving assistance device 110 further includes the control signal output section 128 that outputs to the own vehicle a control signal for executing travel control of the own vehicle. The radio wave state monitoring section 126 outputs the alarm information including information on the region where wireless communication is not available in the periphery of the own vehicle to the control signal output section 128 in the alarm process (step 914A). Based on this alarm information, the control signal output section 128 outputs a control signal of a case where the other vehicle exists in the region where wireless communication is not available. With such configuration, when the other vehicle exists in the region where wireless communication is not available, the control signal for surely avoiding collision with the other vehicle can be outputted to the own vehicle.

As explained above, according to the present invention, in safety driving assistance using wireless communication, when other vehicle enters a region where wireless communication is not available due to the radio wave shielding effect of the own vehicle and the other vehicle in the vicinity of the own vehicle, required notification to the operator and control signal outputting required for travel control of the own vehicle can be executed. In concrete terms, the fact that the vehicle in question has entered the region where wireless communication is not available and the estimated location of the region with respect to the own vehicle can be outputted as the notification to the operator or the control signal to the own vehicle. Therefore, it helps the operator and the travel control device of the own vehicle to grasp the present location of the other vehicles, and can contribute to prevention of collision.

Also, according to the present invention, even when the region where wireless communication is not available changes according to the status of the own vehicle and the other vehicles, flexible response becomes possible. In other words, in a dump truck and the like, the radio wave shielding effect changes according to the loading status also. However, according to the present invention, even in such case, the region where wireless communication is not available can be surely determined from the communication status during working, and therefore flexible response is possible.

Furthermore, each embodiment and various modifications explained above are only an example, and the present invention is not limited to the contents of them as far as the features of the invention are not spoiled. The present invention is not limited to the embodiments and the modifications described above, and various alterations are possible within a scope not deviating from the substance of the present invention.

The disclosed contents of the basic application for the right of priority described below are hereby incorporated by reference.

Japanese Patent Application No. 2015-119093 (applied on Jun. 12, 2015)

LIST OF REFERENCE SIGNS

101 Own vehicle
102, 103 Other vehicle
110 Safety driving assistance device
121 Dynamic information acquiring section
122 Location measuring section
123 Wireless communication section
124 Own vehicle/other vehicle information managing section
125 Collision risk determining section
126 Radio wave state monitoring section
127 Operator notification section
128 Control signal output section
130 Vehicle information DB
150 Reception log DB

The invention claimed is:
1. An on-board terminal device, comprising:
a GPS that measures a location of an own vehicle or a location measuring sensor that obtains the location of the own vehicle based on the result of measurement of the relative distance to a reference point arranged within a mine;

a transmitter that transmits own vehicle information including location information of the own vehicle to other vehicles and a receiver that receives other vehicle information including location information of the other vehicles transmitted from the other vehicles by execution of wireless communication with the other vehicles; and a computer, wherein the computer is configured to estimate the location of the other vehicles, calculate relative distances between the own vehicle and the other vehicles when the wireless communication has been interrupted, execute an alarm process for preventing collision of the own vehicle and the other vehicles when the relative distance is less than a predetermined threshold, and notify an operator of the own vehicle with a notification about the other vehicle, or output a control signal for executing travel control of the own vehicle to the own vehicle, wherein when the computer outputs alarm information including information on a region where the wireless communication is not available in the periphery of the own vehicle in the alarm process, the computer notifies the operator of the own vehicle of the region where the wireless communication is not available based on the alarm information, or outputs the control signal of a case where the other vehicles exist in the region where the wireless communication is not available based on the alarm information, and wherein the computer calculates a reception rate of the wireless communication with respect to a plurality of divided regions set beforehand in the periphery of the own vehicle respectively based on a reception log of the other vehicle information of the past, and determines divided regions where the reception rate of the wireless communication is less than a predetermined reference value out of the plurality of divided regions to be a region where the wireless communication is not available.

2. The on-board terminal device according to claim claim 1, wherein the computer executes the wireless communication with a plurality of the other vehicles respectively, the computer classifies the plurality of other vehicles into a plurality of groups based on a predetermined classification element, and calculates a reception rate of the wireless communication for each of the divided regions with respect to each of the groups, and the classification element includes at least any one of the vehicle height, vehicle type, relative direction with respect to the own vehicle, and vehicle status.

3. The on-board terminal device according to claim 2, wherein when a total value of the reception number of the other vehicle information from each of other vehicles included in the same group as the other vehicle where the wireless communication has been interrupted is less than a predetermined threshold, the computer merges the group and other groups, and calculates a reception rate of the wireless communication.

4. The on-board terminal device according to claim 1, wherein the computer continuously executes the alarm process for a predetermined alarm duration period when the wireless communication has been interrupted, and the computer stops execution of the alarm process when the wireless communication has been restarted after a lapse of the alarm time or within the alarm time.

5. A vehicle collision prevention method, comprising the steps of:

measuring a location of an own vehicle;

transmitting own vehicle information including location information of the own vehicle to other vehicles and receiving other vehicle information including location information of the other vehicles from the other vehicles by executing wireless communication with the other vehicles;

estimating locations of the other vehicles and calculating a relative distance between the own vehicle and the other vehicles when the wireless communication has been interrupted; and executing an alarm process for preventing collision of the own vehicle and the other vehicles by a computer when the relative distance is less than a predetermined threshold to thereby prevent collision of the own vehicle and the other vehicles, wherein alarm information including information on a region where the wireless communication is not available in the periphery of the own vehicle is outputted from the computer in the alarm process, and an operator of the own vehicle is notified of the region where the wireless communication is not available or, when there exists the other vehicle in the region where the wireless communication is not available, a control signal for executing travel control of the own vehicle is outputted to the own vehicle based on the alarm information.

6. The vehicle collision prevention method according to claim 5, wherein, in the alarm process, based on a reception log of the other vehicle information of the past, a reception rate of the wireless communication is respectively calculated with respect to a plurality of divided regions set beforehand in the periphery of the own vehicle, and a divided region where the reception rate of the wireless communication is less than a predetermined reference value out of the plurality of divided regions is determined to be a region where the wireless communication is not available.

7. The vehicle collision prevention method according to claim 6, wherein the wireless communication is executed with a plurality of the other vehicles respectively, in the alarm process, the plurality of other vehicles are classified into a plurality of groups based on a predetermined classification element, a reception rate of the wireless communication is calculated for each of the divided regions with respect to each of the groups, and the classification element includes at least any one of the vehicle height, vehicle type, relative direction with respect to the own vehicle, and vehicle status.

8. The vehicle collision prevention method according to claim 7, wherein, in the alarm process, when a total value of reception number of times of the other vehicle information from each of other vehicles included in the same group as another vehicle where the wireless communication has been interrupted is less than a predetermined threshold, the group and other groups are merged, and a reception rate of the wireless communication is calculated.

9. The vehicle collision prevention method according to claim 5, wherein the alarm process is executed continuously for a predetermined alarm time when the wireless communication has been interrupted, and execution of the alarm process is stopped when the wireless communication has been restarted after a lapse of the alarm time or within the alarm time.

* * * * *